United States Patent
Luo et al.

(10) Patent No.: US 9,493,646 B2
(45) Date of Patent: *Nov. 15, 2016

(54) BLOW MOLDED THERMOPLASTIC COMPOSITION

(71) Applicant: Ticona LLC, Florence, KY (US)

(72) Inventors: Rong Luo, Florence, KY (US); Xinyu Zhao, Cincinnati, OH (US); Joseph Grenci, Florence, KY (US)

(73) Assignee: Ticona LLC, Florence, KY (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/804,372

(22) Filed: Mar. 14, 2013

(65) Prior Publication Data

US 2013/0273287 A1 Oct. 17, 2013

Related U.S. Application Data

(60) Provisional application No. 61/707,320, filed on Sep. 28, 2012, provisional application No. 61/717,946, filed on Oct. 24, 2012, provisional application No. 61/623,618, filed on Apr. 13, 2012, provisional (Continued)

(51) Int. Cl.
*C08L 63/00* (2006.01)
*C08L 81/04* (2006.01)
(Continued)

(52) U.S. Cl.
CPC ............... *C08L 63/00* (2013.01); *B32B 1/08* (2013.01); *B60K 15/03177* (2013.01); *C08L 81/04* (2013.01); *Y10T 428/139* (2015.01); *Y10T 428/1352* (2015.01); *Y10T 428/1393* (2015.01)

(58) Field of Classification Search
CPC .... C08L 81/02; C08L 81/04; C08L 23/0884; C08L 33/068; C08L 63/00; F16L 11/00; F16L 9/133; F16L 9/147; Y10T 428/1352; Y10T 428/1379; Y10T 428/2958; B32B 1/08; B60K 15/03177

USPC ................. 428/34.1, 35.7, 36.92, 36.9, 389; 523/400; 525/189

See application file for complete search history.

(56) References Cited

U.S. PATENT DOCUMENTS

| | | |
|---|---|---|
| 3,286,305 A | 11/1966 | Seckel |
| 3,354,129 A | 11/1967 | Edmonds, Jr. et al. |

(Continued)

FOREIGN PATENT DOCUMENTS

| | | |
|---|---|---|
| CA | 2032370 | 6/1991 |
| EP | 0900650 | 3/1999 |

(Continued)

OTHER PUBLICATIONS

International Search Report and Written Opinion for PCT/US2013/036350 dated Apr. 25, 2014, 10 pages.

(Continued)

*Primary Examiner* — Yan Lan
(74) *Attorney, Agent, or Firm* — Dority & Manning, P.A.

(57) ABSTRACT

Components formed of blow molded thermoplastic compositions are described. The blow molded thermoplastic compositions exhibit high strength and flexibility. Methods for forming the thermoplastic compositions are also described. Formation methods include dynamic vulcanization of a composition that includes an impact modifier dispersed throughout a polyarylene sulfide. A crosslinking agent is combined with the other components of the composition following dispersal of the impact modifier. The crosslinking agent reacts with the impact modifier to form crosslinks within and among the polymer chains of the impact modifier. The compositions can exhibit excellent physical characteristics at extreme temperatures and can be used to form, e.g., tubular member such as pipes and hoses and fibers.

21 Claims, 19 Drawing Sheets

Related U.S. Application Data application No. 61/665,423, filed on Jun. 28, 2012, provisional application No. 61/678,370, filed on Aug. 1, 2012, provisional application No. 61/703,331, filed on Sep. 20, 2012.

(51) Int. Cl.
*B32B 1/08* (2006.01)
*B60K 15/03* (2006.01)

(56) References Cited

U.S. PATENT DOCUMENTS

| | | |
|---|---|---|
| 3,919,177 A | 11/1975 | Campbell |
| 4,337,329 A | 6/1982 | Kubo et al. |
| 4,368,321 A | 1/1983 | Sherk et al. |
| 4,371,671 A | 2/1983 | Anderson |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 2,418,255 A | 8/1987 | Chacko et al. |
| 4,689,365 A | 8/1987 | Chacko et al. |
| 4,814,430 A | 3/1989 | Iwasaki et al. |
| 4,889,893 A | 12/1989 | Kobayashi et al. |
| 5,006,605 A | 4/1991 | Mizuno et al. |
| 5,015,704 A * | 5/1991 | Takekoshi et al. .......... 525/537 |
| 5,047,465 A | 9/1991 | Auerbach |
| 5,078,948 A | 1/1992 | Troutman et al. |
| 5,087,666 A | 2/1992 | Yu et al. |
| 5,149,731 A | 9/1992 | Uota et al. |
| 5,240,973 A | 8/1993 | Katoh et al. |
| 5,240,988 A | 8/1993 | Kohler et al. |
| 5,248,730 A | 9/1993 | Yamao |
| 5,270,305 A | 12/1993 | Palmer |
| 5,380,783 A | 1/1995 | Satake et al. |
| 5,397,839 A | 3/1995 | Patel |
| 5,504,141 A | 4/1996 | Collard et al. |
| 5,529,743 A | 6/1996 | Powell |
| 5,578,679 A | 11/1996 | Suzuki et al. |
| 5,589,544 A | 12/1996 | Horrion |
| 5,625,002 A | 4/1997 | Kadoi et al. |
| 5,652,287 A | 7/1997 | Sullivan |
| 5,654,358 A | 8/1997 | Kadoi et al. |
| 5,654,383 A | 8/1997 | Köhler et al. |
| 5,668,214 A | 9/1997 | Suzuki |
| 5,817,723 A | 10/1998 | Flexman, Jr. et al. |
| 5,830,965 A | 11/1998 | Imaizumi et al. |
| 5,837,758 A | 11/1998 | Brown et al. |
| 5,840,830 A | 11/1998 | Miyahara et al. |
| 6,001,934 A * | 12/1999 | Yamanaka et al. .......... 525/383 |
| 6,015,858 A | 1/2000 | Gornowicz |
| 6,019,127 A | 2/2000 | Orita et al. |
| 6,020,431 A | 2/2000 | Venkataswamy et al. |
| 6,041,824 A | 3/2000 | Powell |
| 6,110,412 A | 8/2000 | Anderson |
| 6,117,950 A | 9/2000 | Yamao et al. |
| 6,225,416 B1 | 5/2001 | Reil et al. |
| 6,281,286 B1 | 8/2001 | Chorvath et al. |
| 6,305,900 B1 * | 10/2001 | Yu ............................ 415/55.1 |
| 6,362,287 B1 | 3/2002 | Chorvath et al. |
| 6,417,293 B1 | 7/2002 | Chorvath et al. |
| 6,485,806 B1 | 11/2002 | Taeyama et al. |
| 6,538,071 B1 | 3/2003 | Fuchs |
| 6,569,955 B1 | 5/2003 | Brewer et al. |
| 6,569,958 B1 | 5/2003 | Gross et al. |
| 6,608,136 B1 | 8/2003 | Dean et al. |
| 6,644,722 B2 | 11/2003 | Cooper |
| 6,649,704 B2 | 11/2003 | Brewer et al. |
| 6,653,437 B2 | 11/2003 | Hinokimori et al. |
| 6,657,014 B1 | 12/2003 | Mori et al. |
| 6,699,946 B1 * | 3/2004 | Lambla et al. .............. 525/537 |
| 6,713,569 B2 | 3/2004 | Chorvath et al. |
| 6,740,707 B2 | 5/2004 | Ono et al. |
| 6,740,709 B2 | 5/2004 | Ono et al. |
| 6,743,868 B2 | 6/2004 | Fournier et al. |
| 6,764,627 B2 | 7/2004 | D'Angelo |
| 6,849,697 B2 | 2/2005 | Lambla et al. |
| 6,875,517 B2 | 4/2005 | Bosshammer et al. |
| 6,888,719 B1 | 5/2005 | Janzen et al. |
| 6,988,305 B1 | 1/2006 | Wilson |
| 7,011,114 B2 | 3/2006 | Suzuki et al. |
| 7,041,741 B2 | 5/2006 | Patel et al. |
| 7,086,420 B2 | 8/2006 | Kahn et al. |
| 7,208,207 B2 | 4/2007 | Ono et al. |
| 7,211,307 B2 | 5/2007 | Potter et al. |
| 7,311,328 B2 | 12/2007 | Best et al. |
| 7,332,120 B2 | 2/2008 | Chapman et al. |
| 7,442,744 B2 | 10/2008 | Tokushige et al. |
| 7,960,473 B2 | 6/2011 | Kobayashi et al. |
| 7,981,981 B2 | 7/2011 | Ajbani et al. |
| 8,105,528 B2 | 1/2012 | Aoki et al. |
| 2004/0074556 A1 | 4/2004 | O'Connell |
| 2005/0089688 A1 | 4/2005 | Mungioli et al. |
| 2005/0208248 A1 | 9/2005 | Ilo et al. |
| 2006/0229417 A1 | 10/2006 | Ferrate et al. |
| 2009/0061134 A1 * | 3/2009 | Ajbani et al. ............ 428/36.4 |
| 2010/0004375 A1 | 1/2010 | Lalgudi et al. |
| 2010/0048777 A1 | 2/2010 | Kodama et al. |
| 2011/0287201 A1 | 11/2011 | Abe et al. |
| 2012/0037397 A1 | 2/2012 | Mhetar |
| 2013/0059976 A1 | 3/2013 | Matsuo et al. |
| 2013/0273286 A1 * | 10/2013 | Luo et al. ............ 428/36.91 |
| 2013/0273288 A1 * | 10/2013 | Luo et al. ............ 428/36.91 |
| 2013/0273289 A1 * | 10/2013 | Luo et al. ............ 428/36.91 |

FOREIGN PATENT DOCUMENTS

| | | |
|---|---|---|
| EP | 2 239 135 A1 | 10/2010 |
| EP | 2418255 | 2/2012 |
| FR | 2617176 | 12/1988 |
| GB | 1558491 | 1/1980 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 2007-169550 A | 7/2007 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | WO 91/18055 | 11/1991 |
| WO | WO 94/16018 | 7/1994 |

OTHER PUBLICATIONS

Chinese Search Report dated Dec. 23, 2015, 2 pages.

* cited by examiner

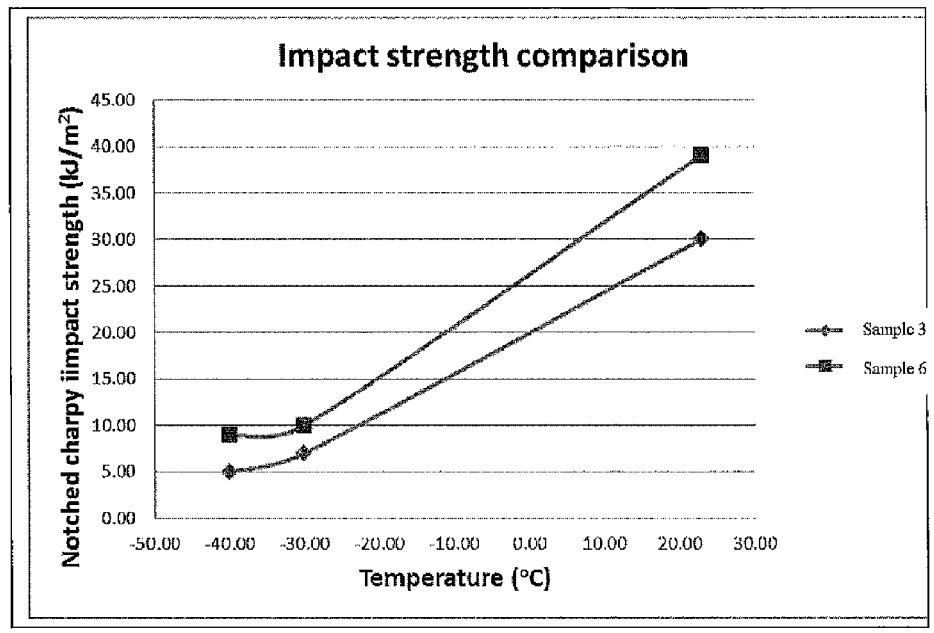
FIG. 20
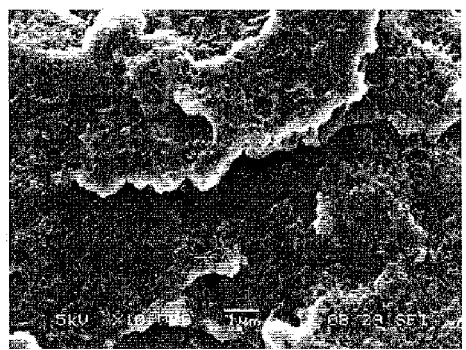 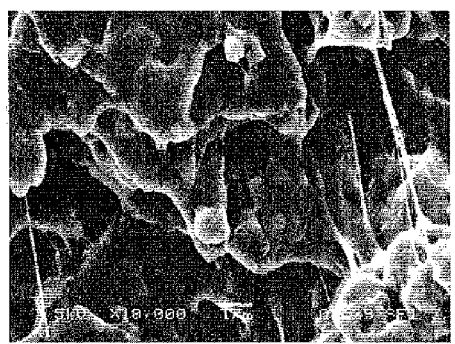
FIG. 21A (Sample 3)      FIG. 21B (Sample 6)

BLOW MOLDED THERMOPLASTIC COMPOSITION

CROSS REFERENCE TO RELATED APPLICATIONS

The present application claims filing benefit of U.S. Provisional Patent Application Ser. No. 61/623,618 having a filing date of Apr. 13, 2012, U.S. Provisional Patent Application Ser. No. 61/665,423 having a filing date of Jun. 28, 2012, U.S. Provisional Patent Application Ser. No. 61/678,370 having a filing date of Aug. 1, 2012, U.S. Provisional Patent Application Ser. No. 61/703,331 having a filing date of Sep. 20, 2012, U.S. Provisional Patent Application Ser. No. 61/707,320 having a filing date of Sep. 28, 2012, and U.S. Provisional Patent Application Ser. No. 61/717,946 having a filing date of Oct. 24, 2012, all of which are incorporated herein in their entirety by reference.

BACKGROUND OF THE INVENTION

Blow molding has been utilized for a number of years to form a variety of hollow plastic parts. It has proven effective to form single layer as well as multi-layer materials and, with more recent advances, has been used to form a variety of complex shapes, for instance via 3D blow molding techniques. The versatility of blow molding processes is providing a route to the formation of multi-functional, one-piece blow molded components that can reduce weight and simplify assembly of consumer goods as well as manufacturing and production devices.

Many of the applications that could benefit from the utilization of blow molded components are quite demanding, and require components that can withstand a variety of both chemical and mechanical insults. For example, components for use in transport and transportation applications should be able to provide a long life under operating conditions that include temperature fluctuations as well as movement during use. Thus, materials generally require both strength and flexibility. Moreover, materials should be resistant to and impermeable to fluids that may be encountered during use such as oil, gas, coolants, water, air, etc. that may also be heated or cooled during use.

Polymeric materials that can be blow molded to form products that exhibit flexibility in addition to high strength and resistance properties are of significant commercial interest. Such materials have been formed in the past by uniformly mixing an elastomeric component with a thermoplastic polyolefin such that the elastomer is intimately and uniformly dispersed as a discrete or co-continuous phase within a continuous phase of the polyolefin. Vulcanization of the composite crosslinks the components and provides improved temperature and chemical resistance to the composition. When vulcanization is carried out during combination of the various polymeric components it is termed dynamic vulcanization.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of thermoplastic compositions. Compositions including blends of polyarylene sulfides with impact modifying polymers have been considered for high performance, high temperature applications.

Unfortunately, elastomeric polymers generally considered useful for impact modification are not compatible with polyarylene sulfides and phase separation has been a problem in forming compositions of the two. Attempts have been made to improve the composition formation, for instance through the utilization of compatibilizers. However, even upon such modifications, compositions including polyarylene sulfides in combination with impact modifying polymers still fail to provide product performance as desired, particularly in applications that require both high heat resistance and high impact resistance.

What are needed in the art are thermoplastic compositions that are amenable to blow molding formation methods and that also exhibit high strength characteristics as well as resistance to degradation, even in extreme environments. More specifically, what are needed are blow molded components that can withstand utilization in harsh working environments.

SUMMARY OF THE INVENTION

Disclosed in one embodiment is a component that includes a blow molded thermoplastic composition. The thermoplastic composition includes a polyarylene sulfide and a crosslinked impact modifier. The composition has excellent material characteristics. For example, the composition can have a notched Charpy impact strength of greater than about 3 $kJ/m^2$ as determined according to ISO Test No. 197-1 at 23° C. and a tensile modulus of less than about 3000 MPa as determined according to ISO Test No. 527 at a temperature of 23° C. and a test speed of 5 mm/min.

Also disclosed is a method for forming a component. The method can include blow molding a thermoplastic composition that includes a polyarylene sulfide and a crosslinked impact modifier.

Components as may be formed can include components for use in harsh environments, such as in transportation applications (e.g., automotive components) or transport applications (e.g., oil and gas field components). By way of example, transport components can include flow lines for use in oil and gas fields. Automotive components can include fuel system components such as gas tanks, and fuel filler necks; interior HVAC components including both reservoirs and ducting; interior and exterior components such as running boards, grill guards, etc.; and engine components such as single layer and multi-layer hoses.

BRIEF DESCRIPTION OF THE FIGURES

The present disclosure may be better understood with reference to the following figures:

FIG. 20 illustrates the effect of temperature change on the notched Charpy impact strength of a thermoplastic composition as described herein and that of a comparison composition.

FIG. 21 is a scanning electron microscope image of a thermoplastic composition as described herein (FIG. 21B) and a comparison thermoplastic composition (FIG. 21A).

DETAILED DESCRIPTION

Figure 1:
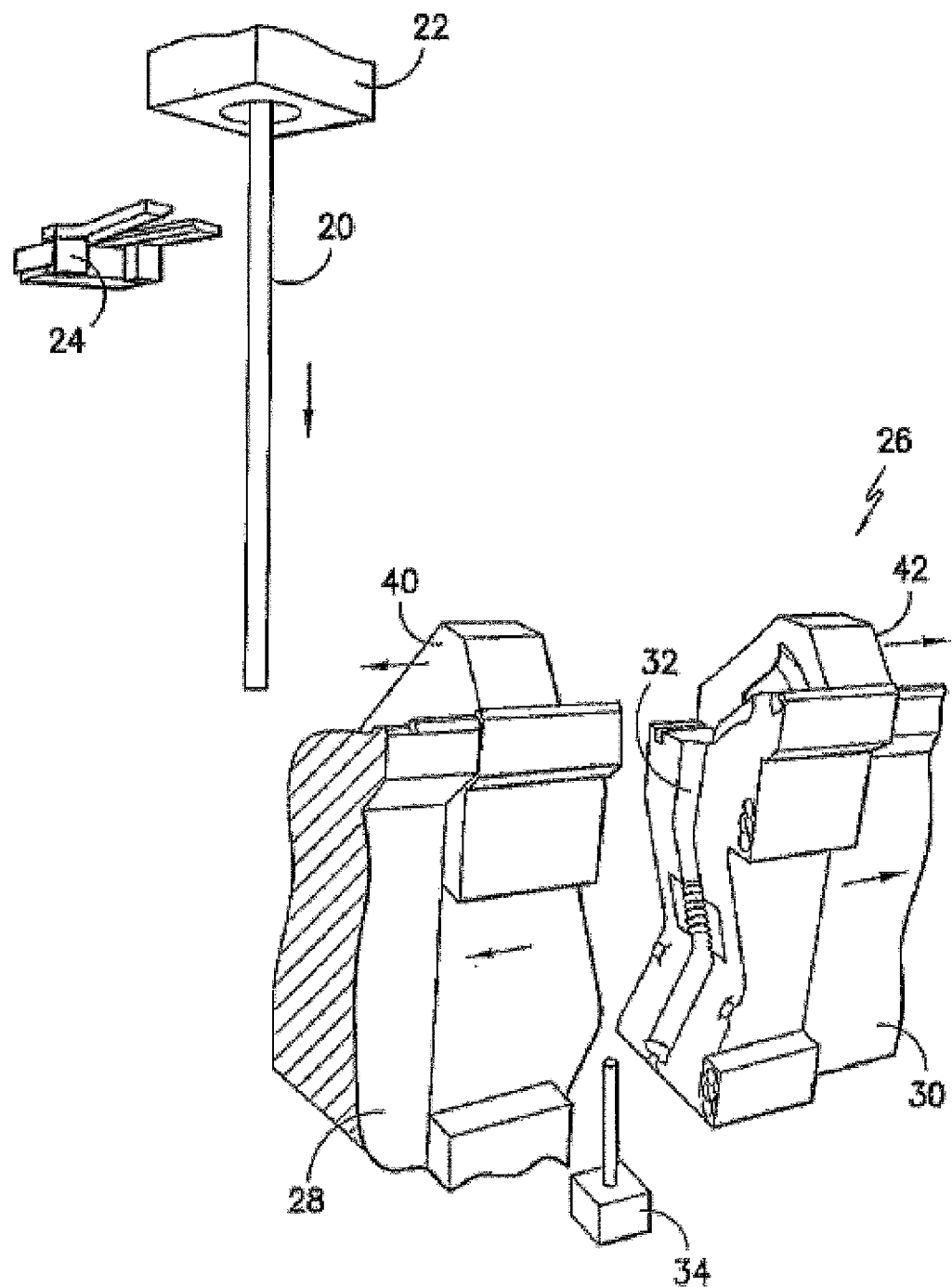
FIG. 1 illustrates a step in a blow molding process as may be utilized in forming a component from the thermoplastic composition.

It is to be understood by one of ordinary skill in the art that the present discussion is a description of exemplary embodiments only, and is not intended as limiting the broader aspects of the present disclosure.

The present disclosure is generally directed to components that include a blow molded thermoplastic composition that exhibits excellent strength and flexibility characteristics as well as resistance to chemical degradation due to contact with, e.g., water, oil, gasoline, gases, synthetic or natural chemicals, etc. Beneficially, the thermoplastic composition can maintain good physical characteristics even when utilized in extreme environments such as may be encountered in transportation and transport applications. For example, the thermoplastic composition can maintain good physical characteristics under conditions in which the components are subjected to motive forces.

The thermoplastic composition can be formed according to a melt processing technique that includes combining a polyarylene sulfide with an impact modifier to form a mixture and subjecting the mixture to dynamic vulcanization. More specifically, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processibility that can be utilized to form a blow molded product that can exhibit excellent resistance to degradation under a variety of conditions.

The high strength and flexibility characteristics of the thermoplastic composition can be evident by examination of the tensile, flexural, and/or impact properties of the materials. For example, the thermoplastic composition can have a notched Charpy impact strength of greater than about 3 kJ/m$^2$, greater than about 3.5 kJ/m$^2$, greater than about 5 kJ/m$^2$, greater than about 10 kJ/m$^2$, greater than about 15 kJ/m$^2$, greater than about 30 kJ/m$^2$, greater than about 33 kJ/m$^2$, greater than about 40 kJ/m$^2$, greater than about 45 kJ/m$^2$, or greater than about 50 kJ/m$^2$ as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the thermoplastic composition can maintain good physical characteristics even at extreme temperatures, including both high and low temperatures. For instance, the thermoplastic composition can have a notched Charpy impact strength of greater than about 8 kJ/m$^2$, greater than about 9 kJ/m$^2$, greater than about 10 kJ/m$^2$, greater than about 14 kJ/m$^2$, greater than about 15 kJ/m$^2$, greater than about 18 kJ/m$^2$, or greater than about 20 kJ/m$^2$ as determined according to ISO Test No. 179-1 at −30° C.; and can have a notched Charpy impact strength of greater than about 8 kJ/m$^2$, greater than about 9 kJ/m$^2$, greater than about 10 kJ/m$^2$, greater than about 11 kJ/m$^2$, greater than about 12 kJ/m$^2$, or greater than about 15 kJ/m$^2$ as determined according to ISO Test No. 179-1 at −40° C.

Moreover, the effect of temperature change on the thermoplastic composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the thermoplastic composition also increases, as expected, but the rate of increase of the impact strength is very high, particularly as compared to a composition that does not include the dynamically cross-linked impact modifier. Accordingly, the thermoplastic composition can exhibit excellent strength characteristics at a wide range of temperatures.

The thermoplastic composition can exhibit very good tensile characteristics. For example, the thermoplastic composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The thermoplastic composition may have a tensile strength at break of greater than about 30 MPa, greater than about 35 MPa, greater than about 40 MPa, greater than about 45 MPa, or greater than about 70 MPa.

In addition, the thermoplastic composition can have a relatively low tensile modulus. For instance, the thermoplastic composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The thermoplastic composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

The thermoplastic composition can also be utilized continuously at high temperature, for instance at a continuous use temperature of up to about 150° C., about 160° C., or about 165° C. without loss of tensile strength. For example, the thermoplastic composition can maintain greater than about 95%, for instance about 100% of the original tensile strength after 1000 hours of heat aging at 165° C. and can maintain greater than about 95%, for instance about 100% of the original tensile elongation at yield after 1000 hours heat aging at 135° C.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be less than about 2500 MPa, less than about 2300 MPa, less than about 2000 MPa, less than about 1800 MPa, or less than about 1500 MPa. The thermoplastic composition may have a flexural strength at break of greater than about 30 MPa, greater than about 35 MPa, greater than about 40 MPa, greater than about 45 MPa, or greater than about 70 MPa.

The deflection temperature under load of the thermoplastic composition can be relatively high. For example, the deflection temperature under load of the thermoplastic composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The thermoplastic composition can also exhibit excellent stability during long term exposure to harsh environmental conditions. For instance, under long term exposure to an acidic environment, the thermoplastic composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the thermoplastic composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the thermoplastic composition can maintain about 80% or more of the initial Charpy notched impact strength. The thermoplastic composition can also maintain desirable strength characteristics following exposure to other potentially degrading materials, such as salts, e.g., road salts as may be encountered in automotive applications.

Permeation resistance can be important for a wide variety of applications for the thermoplastic composition, for instance when utilizing the composition in formation of blow molded storage tanks or the like. The composition can exhibit excellent permeation resistance to a wide variety of materials. For instance, a blow molded product formed of the composition can exhibit a permeation resistance to a fuel or a fuel source (e.g., gasoline, diesel fuel, jet fuel, unrefined or refined oil, etc.) of less than about 10 g-mm/m²-day, less than about 5 g-mm/m²-day, less than about 3 g-mm/m²-day, or less than about 2 g-mm/m²-day. By way of example, the thermoplastic composition (or a blow molded product formed of the thermoplastic composition) can exhibit a permeation resistance to an ethanol blend of ethanol/iso-octane/toluene at a weight ratio of 10:45:45 at 40° C. of less than about 10 g-mm/m²-day, less than about 3 g-mm/m²-day, less than about 2.5 g-mm/m²-day, less than about 1 g-mm/m²-day, or less than about 0.1 g-mm/m²-day. The permeation resistance to a blend of 15 wt. % methanol and 85 wt. % oxygenated fuel (CM15A) at 40° C. can be less than about 5 g-mm/m²-day, less than about 3 g-mm/m²-day, less than about 2.5 g-mm/m²-day, less than about 1 g-mm/m²-day, less than about 0.5 g-mm/m²-day, less than about 0.3 g-mm/m²-day, or less than about 0.15 g-mm/m²-day. The permeation resistance to methanol at 40° C. can be less than about 1 g-mm/m²-day, less than about 0.5 g-mm/m²-day, less than about 0.25 g-mm/m²-day, less than about 0.1 g-mm/m²-day, or less than about 0.06 g-mm/m²-day. Permeation resistance can be determined according to SAE Testing Method No. J2665. In addition, the thermoplastic composition can maintain the original density following long term exposure to hydrocarbons. For example, the composition can maintain greater than about 95% of original density, greater than about 96% of original density, such as about 99% of original density following long term (e.g., greater than about 14 days) exposure to hydrocarbons such as heptane, cyclohexane, toluene, and so forth, or combinations of hydrocarbons.

The thermoplastic composition can exhibit good heat resistance and flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
| --- | --- | --- | --- |
| V-0 | <10 | No | No |
| V-1 | <30 | No | No |
| V-2 | <30 | Yes | No |
| Fail | <30 |  | Yes |
| Fail | >30 |  | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The thermoplastic composition can also exhibit good processing characteristics, for instance as demonstrated by the melt viscosity of the composition. For instance, the thermoplastic composition can have a melt viscosity of less than about 2800 poise as measured on a capillary rheometer at 316° C. and 400 sec$^{-1}$ with the viscosity measurement taken after five minutes of constant shear. Moreover, the thermoplastic composition can exhibit improved melt stability over time as compared to thermoplastic compositions that do not include crosslinked impact modifiers. Thermoplastic compositions containing a polyarylene sulfide that do not include a crosslinked impact modifier tend to exhibit an increase in melt viscosity over time, while disclosed compositions can maintain or even decrease in melt viscosity over time.

The thermoplastic composition can have a complex viscosity as determined at low shear (0.1 radians per second (rad/s)) and 310° C. of greater than about 10 kPa/sec, greater than about 25 kPa/sec, greater than about 40 kPa/sec, greater than about 50 kPa/sec, greater than about 75 kPa/sec, greater than about 200 kPa/sec, greater than about 250 kPa/sec, greater than about 300 kPa/sec, greater than about 350 kPa/sec, greater than about 400 kPa/sec, or greater than about 450 kPa/sec. Higher value for complex viscosity at low shear is indicative of the crosslinked structure of the composition and the higher melt strength of the thermoplastic composition. In addition, the thermoplastic composition can exhibit high shear sensitivity, which indicates excellent characteristics for use in blow molding formation processes.

The thermoplastic composition can be processed according to a blow molding process in formation of an automotive component. Blow molding processes such as continuous and intermittent extrusion blow molding, injection blow molding, and stretch blow molding can be utilized. 3D blow molding, dual process overmolding, and so forth are likewise encompassed herein.

One blow molding process is illustrated sequentially in FIGS. 1 through 5. Referring to FIG. 1, for instance, the thermoplastic composition is first heated and extruded into a parison 20 using a die 22 attached to an extrusion device. As shown, the parison 20 is extruded into a downward direction. When the parison 20 is formed as shown in FIG. 1, the composition should have sufficient melt strength to prevent gravity from undesirably elongating portions of the parison and thereby forming non-uniform wall thicknesses and other imperfections. On the other hand, the melt elongation must also be sufficiently high to allow for processibility of the composition. Thus, there must be a balance between melt strength and melt elongation such that the composition can be processed while maintaining uniform wall thickness. In other words, the engineering stress must be sufficiently high at a high percent strain to allow for processibility of the composition.

As shown in FIG. 1, the parison 20 is extruded adjacent a clamping mechanism 24 which is typically attached to a robotic arm. Also positioned to receive the parison 20 is a molding device 26. In the embodiment illustrated, the molding device 26 includes a first portion 28 and a second portion 30 that together combine to form a three-dimensional mold cavity 32. In the embodiment illustrated both portions 28 and 30 of the molding device move toward and away from each other. In an alternative embodiment, however, one portion may remain stationary while only the other portion moves. A molding device may also include more than two portions, as is known.

Figure 2:
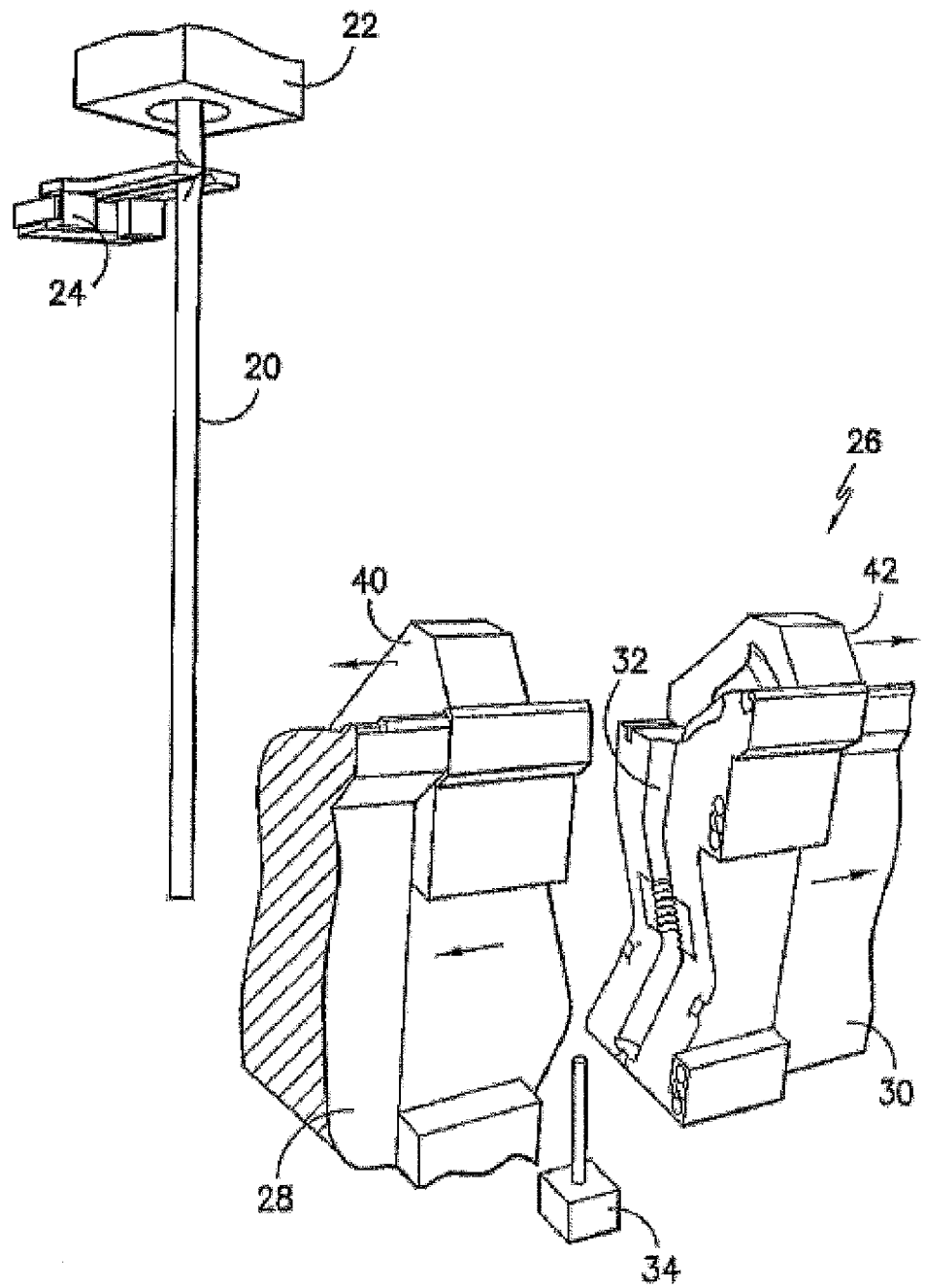
FIG. 2 illustrates a step in a blow molding process as may be utilized in forming a component from the thermoplastic composition.
Figure 3:
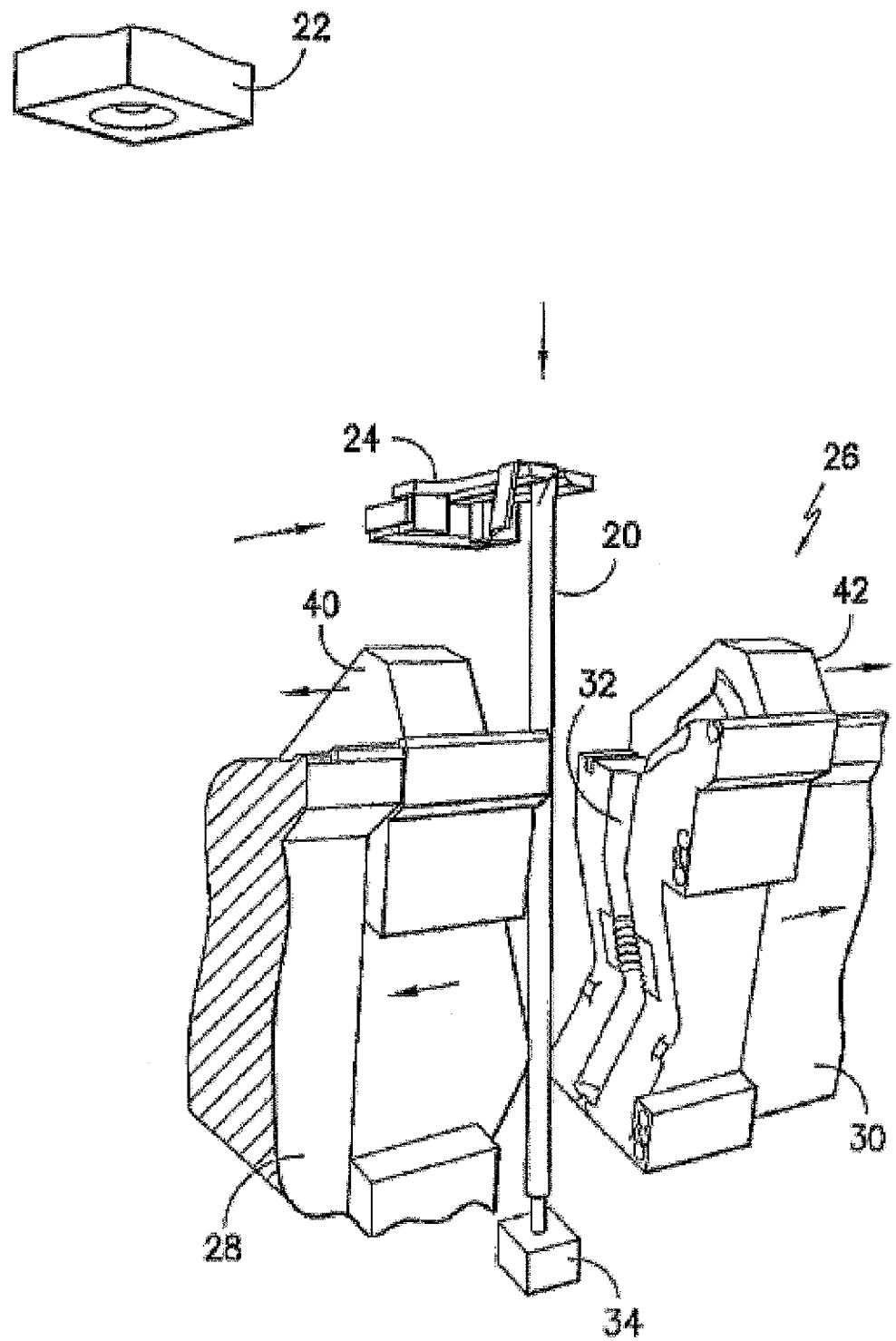
FIG. 3 illustrates a step in a blow molding process as may be utilized in forming a component from the thermoplastic composition.

Referring to FIG. 2, the next step in the process is for the clamping mechanism 24 to engage a top of the parison 20 after the parison 20 has reached a desired length. As shown in FIG. 3, the clamping mechanism then moves the parison into a position so that the parison can interact with the molding device 26. The clamping mechanism 24 can be moved with the aid of a robotic arm.

As can be appreciated, a certain period of time elapses from formation of the parison 20 to clamping and moving the parison 20 into engagement with the molding device 26. During this stage of the process, the melt strength of the polymeric composition should be high enough such that the parison 20 maintains its shape during movement. The polymeric composition should also be capable of remaining in a semi-fluid state and not solidifying too rapidly before blow molding commences.

As shown in FIG. 3, the robotic arm also engages the bottom of the parison 20 with a fluid supply device 34 which is used during blow molding.

Figure 4:
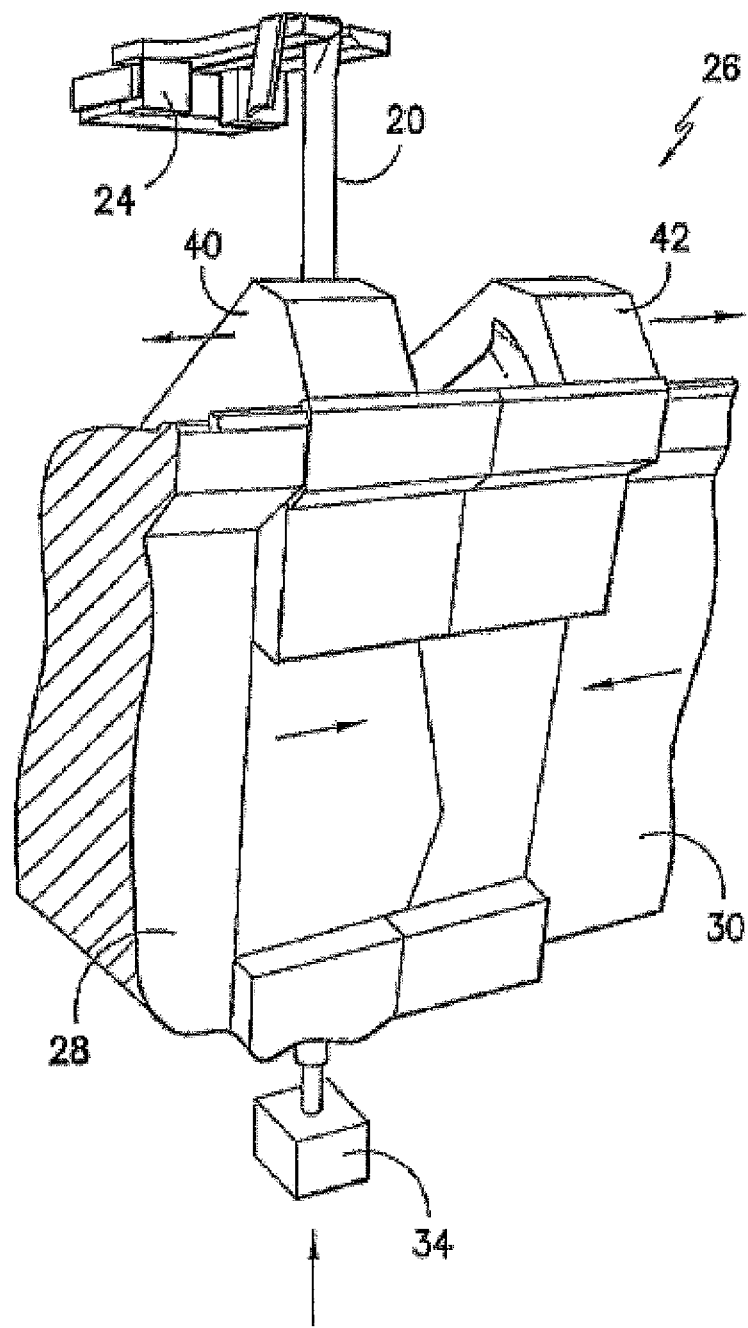
FIG. 4 illustrates a step in a blow molding process as may be utilized in forming a component from the thermoplastic composition.

Referring to FIG. 4, once the parison 20 has been moved into position, the first portion 28 and the second portion 30 of the molding device 26 move together such that the parison 20 partially extends through the mold cavity 32 as shown in FIG. 4.

As shown in FIG. 4, the first portion 28 includes a top section 40 and the second portion 30 includes a top section 42. In the embodiment illustrated, the bottom sections of the molding device 26 first close leaving the top sections 40 and 42 open. In this manner, the parison 20 can first engage the bottom portion of the molding cavity 32. The clamping device 24 can then robotically move the top of the parison prior to closing the top sections 40 and 42 of the molding device. Once the clamping mechanism is properly located, as shown in FIG. 5, the top sections of the mold close such that the parison extends the entire length of the mold cavity.

Figure 5:
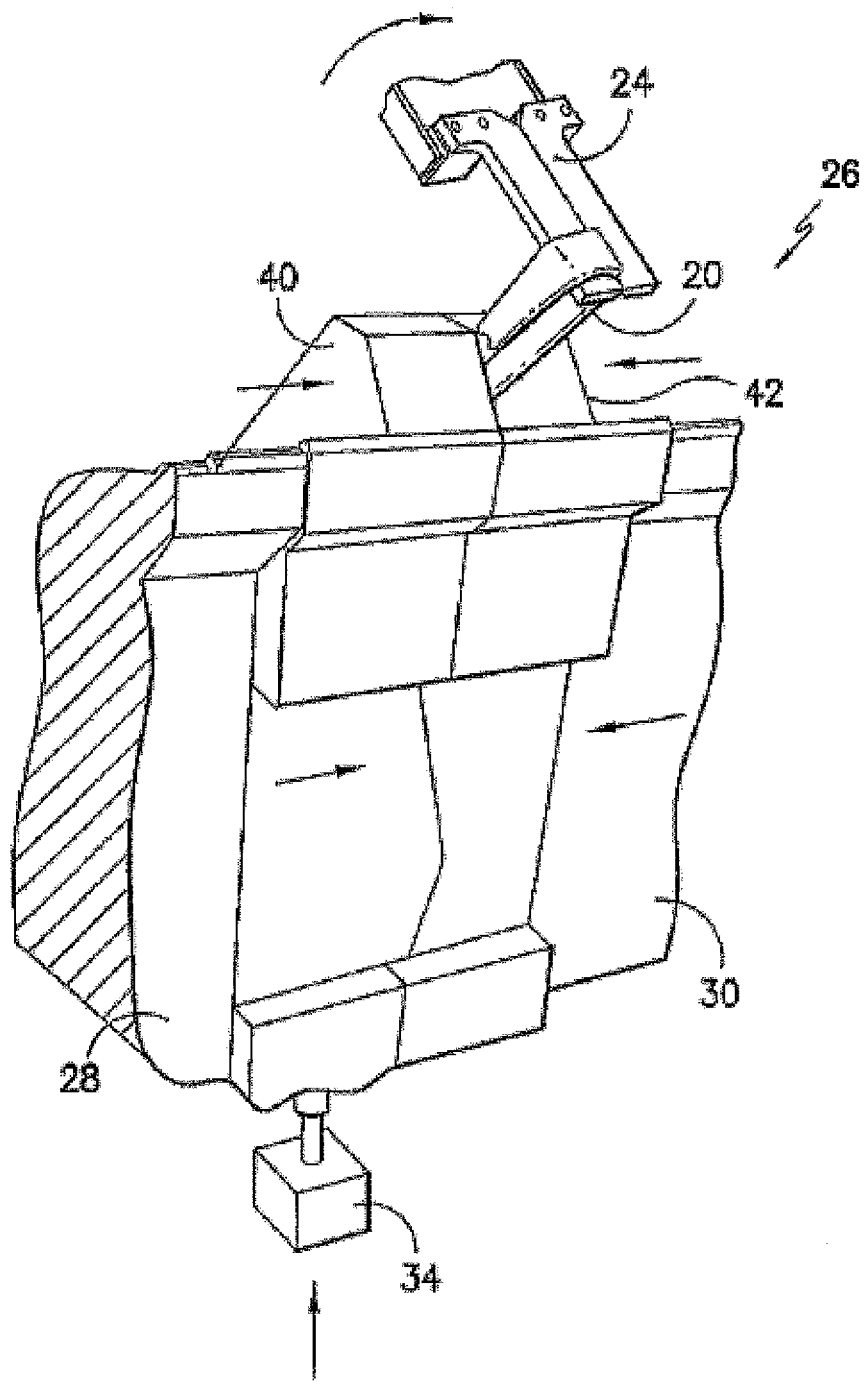
FIG. 5 illustrates a step in a blow molding process as may be utilized in forming a component from the thermoplastic composition.

Having separately movable top sections as shown in FIGS. 4 and 5 are needed in some molding applications when complex shapes are being formed. Having separate sections of the mold surround the parison at different times allows a robotic arm to continue to manipulate the parison in order to place in the resulting part angular displacements.

Once the top sections 40 and 42 of the molding device 26 are closed as shown in FIG. 5, a gas, such as an inert gas, is fed into the parison 20 from the gas supply 34. The gas supplies sufficient pressure against the interior surface of the parison such that the parison conforms to the shape of the mold cavity 32.

After blow molding, the finished component is then removed and used as desired. In one embodiment, cool air can be injected into the molded part for solidifying the polymer prior to removal from the molding device 26.

Figure 6:
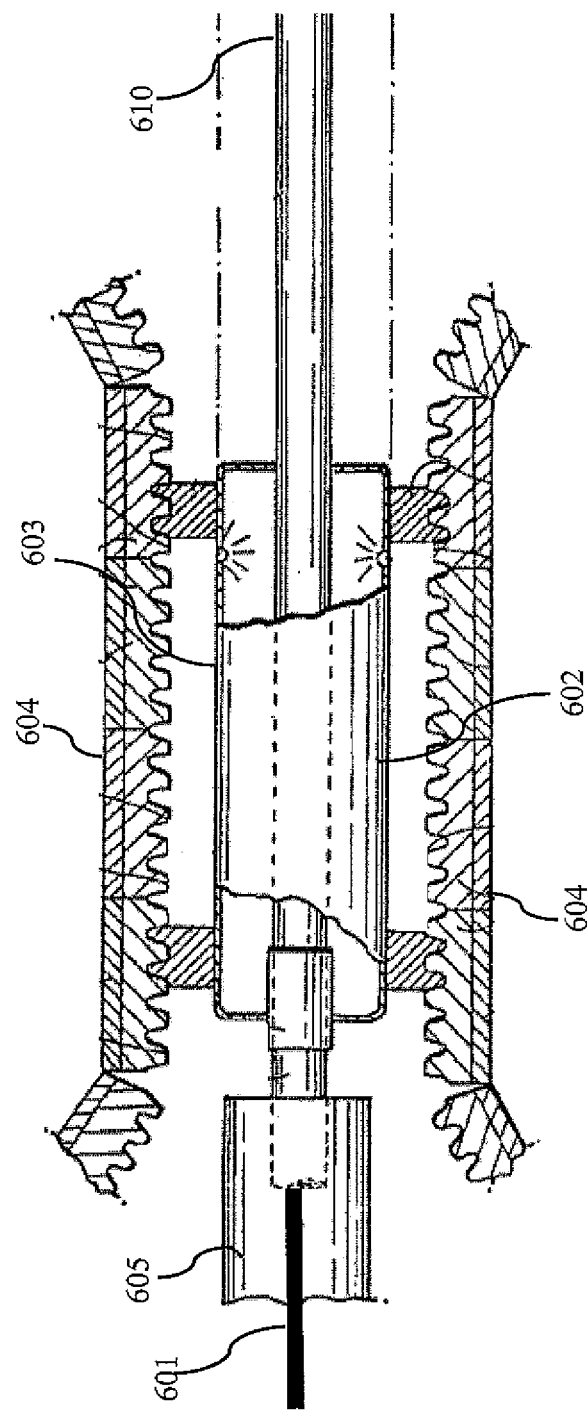
FIG. 6 illustrates a continuous blow molding process as may be utilized in forming a tubular component from the thermoplastic composition

Blow molding processes are not limited to robotic 3-D blow molding methodology as illustrated in FIGS. 1-5, however, and other blow molding processes may alternatively be utilized in forming a component. By way of example, in one embodiment, a continuous blow molding process can be used to form larger items, such as long tubular components as may be useful in piping applications. FIG. 6 presents a schematic illustration of one method as may be utilized in forming a long tubular component according to a continuous blow molding process. In a continuous process, a stationary extruder (not shown) can plasticize the force the molten thermoplastic composition through a head to form a continuous parison 601. An accumulator 605 can be used to support the parison and prevent sagging prior to molding. The parison may be fed to a mold formed of articulated sections 602, 603 that travel in conjunction with the continuous parison on a mold conveyor assembly 604. Air under pressure is applied to the parison to blow mold the thermoplastic composition within the mold. After the thermoplastic composition has been molded and sufficiently cooled within the mold as the mold and thermoplastic composition travel together, the mold segments are separated from one another and the formed section of the component (e.g., the pipe) 606 is removed from the conveyor and taken up, as on a take-up reel (not shown).

A component can include the thermoplastic composition throughout the entire component or only a portion of the component. For instance, when nsidering a component having a large aspect ratio (L/D>1), such as a tubular member, the component can be formed such that the thermoplastic composition extends along a section of the component and an adjacent section can be formed of a different composition, for instance a different thermoplastic composition. Such a component can be formed by, e.g., altering the material that is fed to a blow molding device during a formation process. The component can include an area in which the two materials are mixed that represents a border region between a first section and a second section formed of different materials. A component can include a single section formed of the thermoplastic composition or a plurality of sections, as desired. Moreover, other sections of a component can be formed of multiple different materials. By way of example, when considering a tubular component such as a fluid conduit, both ends of the tubular component can be formed of the thermoplastic composition and a center section can be formed of a less flexible composition. Thus, the more flexible ends can be utilized to tightly affix the component to other components of a system. Alternatively, a center section of a component could be formed from the thermoplastic composition, which can improve flexibility of the component in that section, making installation of the component easier.

A large variety of components can be formed according to a process that includes blow molding the thermoplastic composition. In one embodiment, components as may be formed may be used in transport application, for instance in transport of oil and gas applications. In one particular embodiment, the thermoplastic composition can be utilized in forming a flowline for use in transporting oil and/or gas at or from a production facility. By way of example, the thermoplastic composition may be blow molded to form a single layer flowline or one or more layers of a bonded or unbounded flowline, such as a multilayer riser or pipeline or a coupling or connector that can be utilized in attaching flowline segments to one another.

Figure 7:
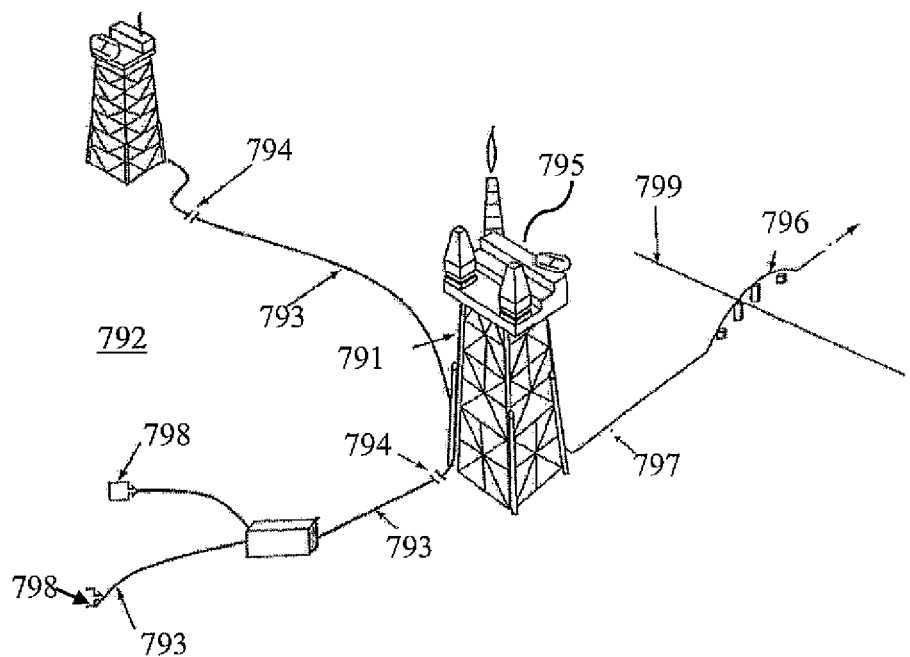
FIG. 7 is a schematic representation of an oil and gas field that may include components as described herein.

FIG. 7 illustrates a typical offshore field that can incorporate a plurality of different types of flowlines, one or more of which may include at least one layer formed of the blow molded thermoplastic composition, for instance as a barrier layer. As can be seen, the offshore field can include fixed risers 791 that can carry production fluid from the sea floor 792 to a platform 795. The thermoplastic composition can be utilized in forming other types of risers as well such as flexible risers that can convey production fluid from a subsea pipeline end manifold through a catenary moored buoy and a yoke to a floating vessel, as is known. Such flexible risers can have any configuration such as a steep S, a lazy S, a steep wave, or a lazy wave configuration.

The field can include infield flowlines 793 that can include the blow molded thermoplastic composition and can carry production fluid, supporting fluids, umbilicals, etc., within the field. The system also includes a plurality of tie-ins 794 at which point different flowlines can be merged, for instance to form a bundled riser and/or where individual flowlines may be altered, for instance through expansion. The system also includes a plurality of satellite wells and manifolds 798 from which the hydrocarbon production fluid is obtained. An export pipeline 797 can carry production fluid from the platform 795 to shore, a storage facility, or a transport vessel. The export pipeline 797 may also include one or more crossings 796 to by-pass other flowlines, e.g., another pipeline 799. Though illustrated as an offshore facility, it should be understood that oil and gas facilities in any location can utilized blow molded components as described herein, and the disclosure is not limited to offshore facilities.

Figure 8:
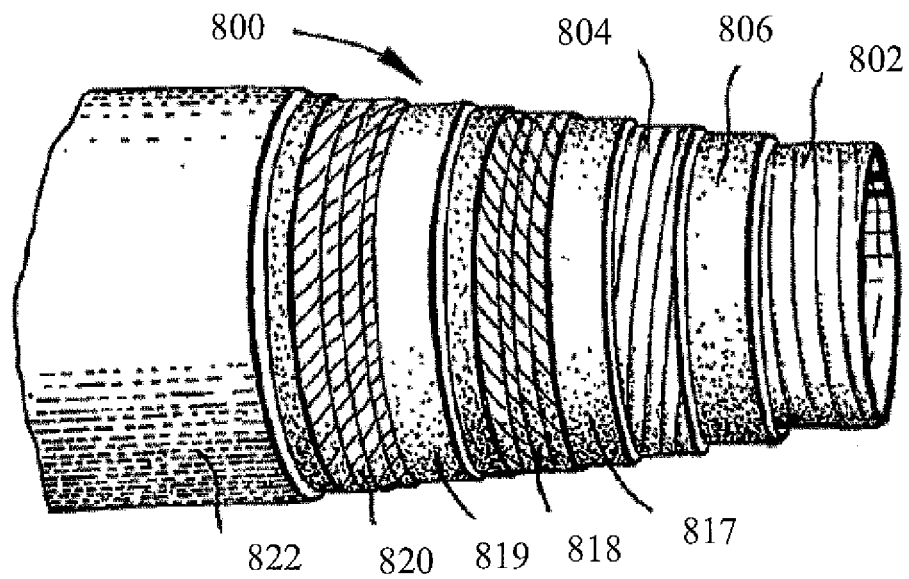
FIG. 8 is a schematic representation of a multilayer riser including one or more blow molded layers formed from the thermoplastic composition.

Referring to FIG. 8, one embodiment of a flexible riser 800 that can incorporate one or more layers formed of the blow molded thermoplastic composition is shown. As shown, the riser 800 has several concentric layers. An innermost layer is generally termed the carcass 802 and can be formed of helically wound stainless steel strip so as to provide resistance against external pressures. The carcass 802 is generally a metal (e.g., stainless steel) tube that supports the adjacent barrier layer 806 and prevents riser collapse due to pressure or loads applied during operation. The bore of the flexible riser 800 can vary depending upon the fluid to be carried by the riser. For instance, the riser 800 can have a smooth bore when intended for use to carry a supporting fluid such as an injection fluid (e.g., water and/or methanol) and can have a rough bore when utilized to carry production fluids (e.g., oil and gas). The carcass 802, when present, can generally be between about 5 and about 10 millimeters in thickness. According to one embodiment, the carcass can be formed by helically wound stainless steel strips that interlock with one another to form the strong, interconnected carcass.

The barrier layer 806 is immediately adjacent the carcass 802. The barrier layer is formed of the blow molded thermoplastic composition and provides strength and flexibility as well as resistance to chemical assaults while preventing permeation of the fluid carried by the riser through the riser wall. The barrier layer 806 can generally be between about 3 and about 10 millimeters in thickness and can be extruded from a melt over the carcass 2.

The riser 8 can also include an outer layer 822 that provides an external sleeve and an external fluid barrier as well as providing protection to the riser from external damage due to, e.g., abrasion or encounters with environmental materials. The outer layer 822 can be formed of a polymeric material such as the thermoplastic composition or a high density polyethylene that can resist both mechanical damage and intrusion of seawater to the inner layers of the riser. According to one embodiment, the outer layer 822 can be a composite material that includes a polymeric material in conjunction with a reinforcement material such as carbon fibers, carbon steel fibers, or glass fibers.

A hoop strength layer 804 can be located external to the barrier layer 806 to increase the ability of the riser to withstand hoop stresses caused by forced applied to the riser wall by a pressure differential. The hoop strength layer can generally be a metal layer formed of, e.g., a helically wound strip of carbon steel that can form a layer of from about 3 to about 7 millimeters in thickness. Additional strength layers 818 and 820 can be formed of helically-wound metal (generally carbon steel) strips. The strength layers 818 and 820 can be separated from the hoop strength layer 804 and from each other by polymeric anti-wear layers 817 and 819. Though the riser 800 includes two strength layers 818, 820, it should be understood that a riser may include any suitable number of strength layers, including no strength layers, one, two, three, or more strength layers. The strength layers 818, 820 may have a width of from about 1 millimeter to about 5 millimeters.

The intervening anti-wear layers 817, 819 can be formed of the thermplastic composition or alternatively can be formed of other polymers such as a polyamide, a high density polyethylene, or the like. In one embodiment, the anti-wear layers 817, 819 can be a composite material that includes unidirectional fibers, for instance carbon or glass fibers. The anti-wear layers 817, 819 can prevent wear of the adjacent strength layers that can come about due to motion of the strips forming the layers. The anti-wear layers 817, 819 can also prevent birdcaging of the adjacent layers. As with the strength layers 818, 820 of the riser 800, the number of anti-wear layers is not particularly limited, and a riser can include no anti-wear layers, one anti-wear layers, or multiple anti-wear layers depending upon the depth and local environment in which the riser will be utilized, the fluid to be carried by the riser, and so forth. The anti-wear layers 817, 819, can be relatively thin, for instance between about 0.2 and about 1.5 millimeters.

While the above description is for an unbounded flexible riser, it should be understood that the thermoplastic composition may likewise be utilized in forming a bonded flowline. For example, the thermoplastic composition may be directly blow molded on to an adjacent layer of a continuous tubular member to form a bonded flowline for use in an offshore oil and gas facility.

Figure 9:
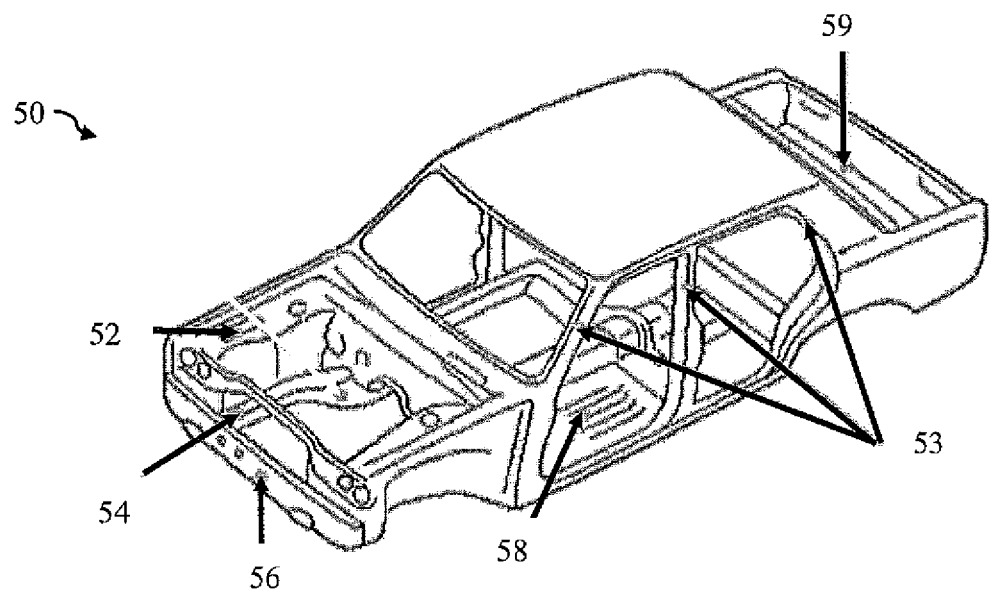
FIG. 9 is a schematic representation of an automobile body showing some representative examples of automotive components that may include a blow molded thermoplastic composition.

In another embodiment, the thermoplastic composition may be blow molded to form a component for use in the transportation field. For instance, blow molded components of the thermoplastic composition can be utilized in forming automotive components. By way of example and without limitation, automotive components of the fuel system, the HVAC system, the engine cooling system, as well as interior and exterior portions of the vehicle body can be formed according to a process that includes blow molding the thermoplastic composition. FIG. 9 illustrates a car body 50 including several automotive components as may include the blow molded thermoplastic composition such as struts 52, supports 54 (e.g., radiator supports), grill guard 56, the floor pan 58, the trunk flooring 59, the inner pillars 53, and so forth.

Figure 10:
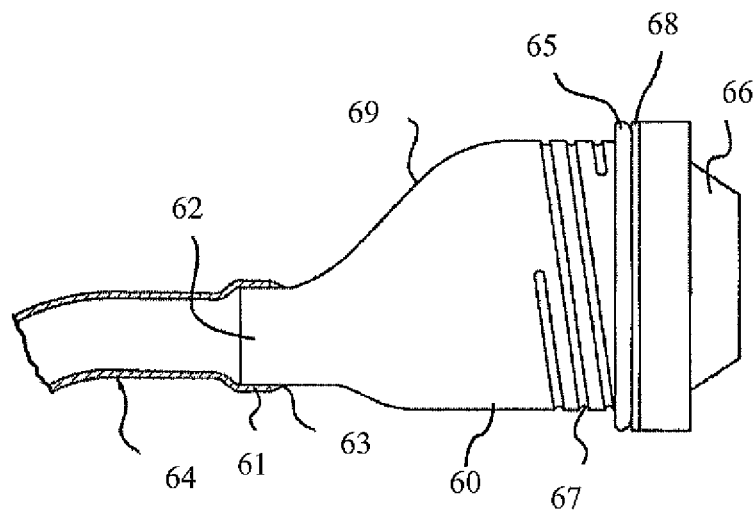
FIG. 10 is a schematic representation of a fuel tank filler neck that may include the blow molded thermoplastic composition.

In one embodiment, components of the fuel system such as the fuel filler neck can be formed of the thermoplastic composition. FIG. 10 illustrates a fuel filler neck 60 as may be blow molded from the thermoplastic composition. A filler tube 64 and a gas cap 66 can be associated with the filler neck 60. The filler neck 60 generally includes a one-piece, seamless funnel member having a generally tubular body, as shown. The filler neck 60 may be adapted to receive a nozzle receptor, which is an insert for receiving a fuel nozzle during fueling. The filler neck includes at one end an opening adapted to receive the gas cap 66, which in this embodiment screws directly into threads 67 integrally formed in the filler neck 60. The threads 67 may be screw, quarter-turn, eighth-turn or quick-turn configurations, or any other known thread configuration. The filler neck 60 narrows as shown at 69 from the first end to an opposite end that includes an outlet opening 62, which is coupled to a first end 61 of the filler tube 64 via a joint 63. The gas cap 66, which can seat against a rolled-over sealing surface 65 formed about the inlet opening, may include a seal 68 to prevent fuel or vapor loss between the gas cap 66 and the filler neck 60. The one-piece, seamless filler neck 60 may be formed from the thermoplastic composition according to a blow molding process. The a flow line such as the filler tube 64 may alternatively or additionally be formed from the thermoplastic composition in a blow molding process, as discussed further herein.

Figure 11:
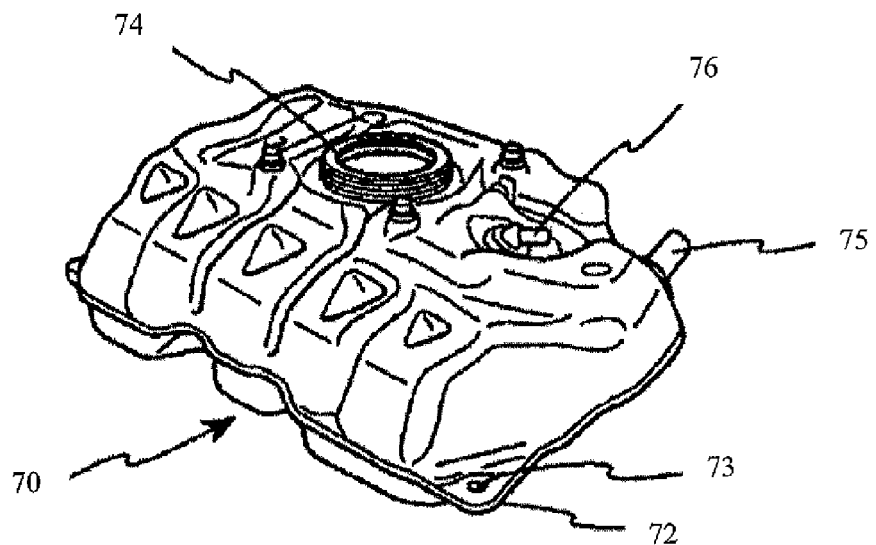
FIG. 11 is a schematic representation of a fluid reservoir such as a gas tank that may include the blow molded thermoplastic composition.

Automotive components as may include the blow molded thermoplastic composition can include reservoirs and tanks. For example, FIG. 11 illustrates a fuel tank 70 that can be formed according to a blow molding process. The fuel tank 70 can have a relatively complicated shape, and can include various features such as a pump unit mounting hole 74 formed in an upper surface of the tank for ingress and egress of a fuel pump (not shown) into and from the fuel tank 70. In addition, a fuel inlet hole 75 into which fuel is supplied from an inlet pipe as may be connected to a fuel filler neck 60 as illustrated in FIG. 10 can be formed in a side surface or the upper surface of the fuel tank 70.

The fuel tank 70 can include an outer circumferential rib 72 formed around a full circumference of the fuel tank 70, and mounting holes 73 can be formed in the outer circumferential rib 72 in several predetermined locations such as in corners thereof. The mounting holes 73 can be used to fasten the fuel tank 70 to the vehicle body with bolts. The fuel tank 70 can also include a mounting hole 76 on the upper side of the fuel tank 70 that can be connectable to a hose (not shown) for collecting evaporated fuel in an interior of the fuel tank 70. The hose can be a single layer or multilayer hose, for instance such as described in more detail within, and can include the thermoplastic composition in one or more layers of the hose.

The fuel tank 70 can be a single layer or multi-layer fuel tank. For instance, an outer wall of the fuel tank 70 can be formed through blow molding and can include one or more layers such as, without limitation, a skin layer, an exterior main layer, an exterior adhesive layer, a barrier layer, an interior adhesive layer and an interior main layer in that order from an outside thereof. The thermoplastic composition can form one or more layers of the multi-layer fuel tank 70. For instance, as the thermoplastic composition can be highly impermeable, the thermoplastic composition can be blow molded to form at least the barrier layer of a multi-layer fuel tank. Other reservoirs as may be formed from the thermoplastic composition can include, without limitation, reservoirs for the windshield washing fluid, the expansion tank, and so forth.

Figure 12:
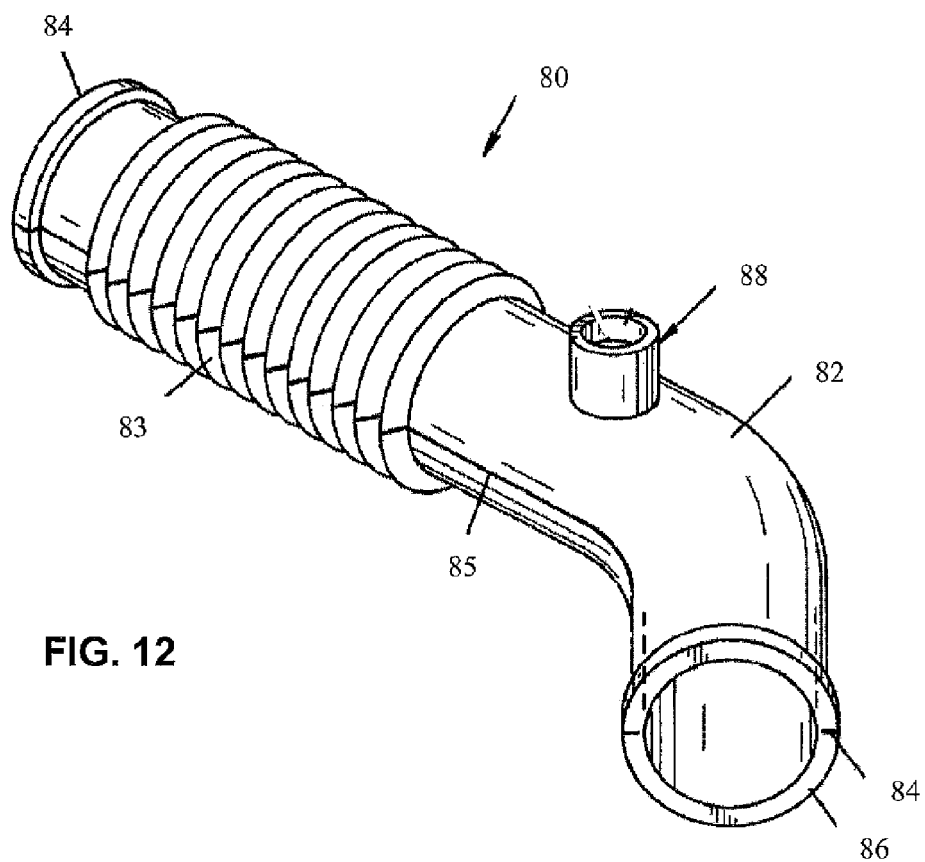
FIG. 12 is a schematic representation of an air duct that may include the blow molded thermoplastic composition.

Another automotive system that may beneficially take advantage of the blow molding capabilities of the thermoplastic composition is the ventilation system. By way of example, FIG. 12 illustrates a tubular air duct 80 that may be formed from the thermoplastic composition according to a blow molding process, for instance an injection blow molding process. As can be seen, the air duct 80 has an elongated body portion 82 with integrally formed, flanged first and second ends 84 and 86, respectively. The air duct 80 also includes a laterally extending port 88. The laterally extending port 88 can be included on the tubular body to allow air to be directed to and from multiple devices on the vehicle. For example, the air duct 80 can be utilized in an exhaust gas recirculation system according to known practice to reduce the exhaust emissions of the engine. The air duct 80 may be utilized to transport clean air from a filter to multiple components of the vehicle such as the inlet manifold as well as to the heating and ventilating system in the passenger compartment, and the laterally extending port 88 can be utilized to divert a portion of the air in the duct 80 to a secondary component.

The air duct 80 can also include a flexible portion 83 that may be formed between the port 88 and end 84 or 86 to facilitate flexibility and installation of the air duct 80. The flanged ends 84 and 86 can permit the air duct 80 to be secured in an air induction system by use of conventional hose clamps in a well-known manner. The air duct 80 is a blow molded component, and can include parting, or split, lines 85 and 87 that are substantially diametrically opposite each other and also displaced approximately ninety degrees from the port 88.

Figure 13:
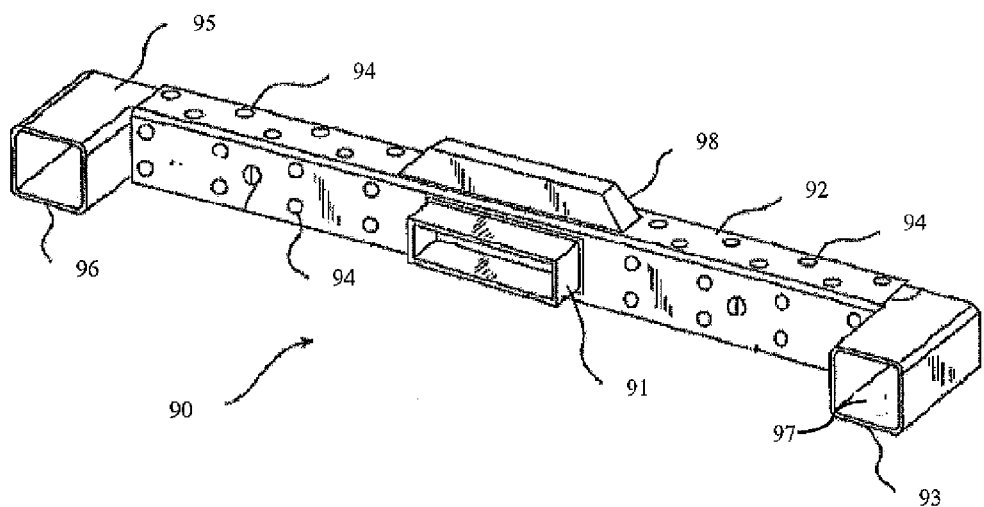
FIG. 13 is a schematic representation of another air duct that may include the blow molded thermoplastic composition.

FIG. 13 illustrates another example of an air duct 90 as may include the blow molded thermoplastic composition. In this embodiment, the air duct may be quite large and may be a portion of a cross car beam 90. The strength characteristics of the thermoplastic composition can be beneficial when forming a large air duct 90 as illustrated. Cross car beam 90 includes a U-shaped rigid support 92 having a plurality of perforations (not shown), and a blow molded rigid, continuous and unitary air duct 95 of the thermoplastic composition, having a hollow interior 97. Rigid hollow duct 95 is attached to rigid support 92 by means of a plurality of attachment heads 94. Duct 95 has extensions 98, 91, 93 and 96 that each provide gaseous communication with the interior 97 of duct 95. For example, conditioned air (e.g., heated, cooled or dehumidified air) introduced through extension 91 travels through interior 97 and can exit duct 95 through extensions 98, 93 and 96. Cross car beam 90 can be used as a cross car beam extending between the door pillars of a vehicle, such as a car or truck.

Figure 14:
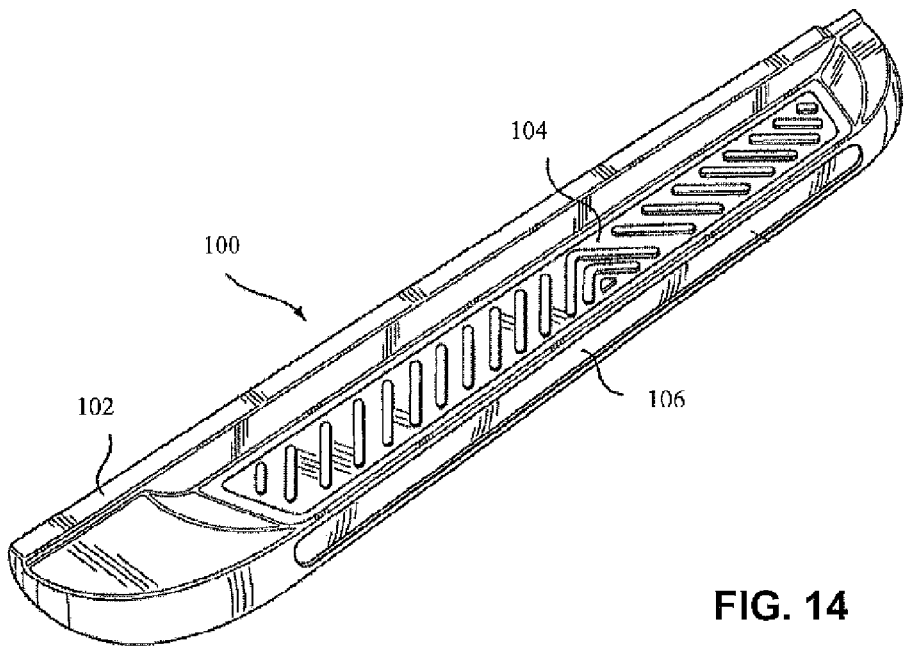
FIG. 14 is a schematic representation of a running board that may include the blow molded thermoplastic composition.

Exterior components of a vehicle can also be formed from the thermoplastic composition by use of a blow molding method. For instance, FIG. 14 illustrates a running board assembly 100 as may include the blow molded thermoplastic composition. The running board assembly 100 includes a running board 102, a step pad 104 and a trim strip 106. The running board 100 has an upper support surface 103. The step pad 104 can be adhered to the supporting surface 103. The running board 102 may be formed of the thermoplastic composition in a blow molding procedure. The running board can include a plurality of recesses as shown that may be formed during the blow molding process by moving components within a blow mold as known and bringing the internal surface of the parison into contact with an opposite portion to form a plurality of ribs. These ribs can provide additional structural strength to the blow molded running board. In general, any pattern of ribs may be formed so as to provide sufficient strength to the running board 102.

Figure 15:
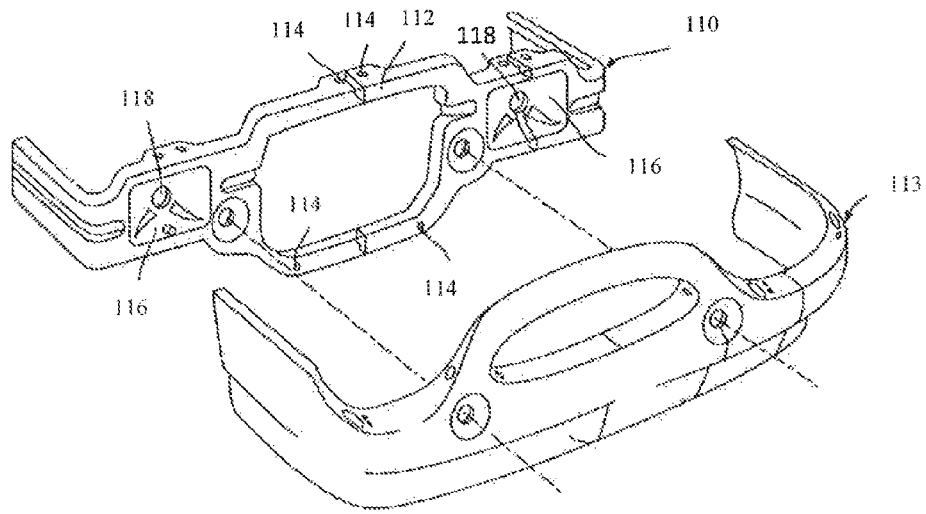
FIG. 15 is a schematic representation of a support structure that may include the blow molded thermoplastic composition.

Another component as may include the thermoplastic composition processed according to a blow molding process is a support structure, an example of which is illustrated in FIG. 15. Support structure 110 is a blow molded hollow, integrally formed structure that can be used to support both the radiator and lights of a motor vehicle. The structure 110 includes a radiator frame portion 112 and a plurality of apertures 114 that can be used for securing a motor vehicle radiator (not shown for sake of clarity) to the support structure 110. A pair of light receiving recesses 116 of the support structure 110 are constructed and arranged to mount headlights (not shown for sake of clarity) for the motor vehicle. The recesses 116 having apertures 118 for receiving electrical connecting portions of the lights. As shown, the support structure 110 can be nestingly received with respect to a motor vehicle front end 113.

Figure 16:
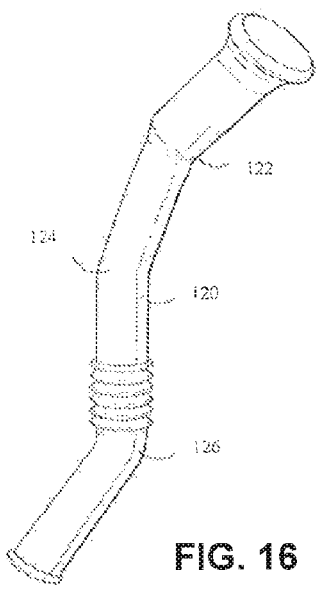
FIG. 16 is a single layer tubular member as may be formed from the thermoplastic composition.

Tubular components are encompassed herein in addition to risers as discussed above. For example, tubular components such as hoses, conduits, flowlines, etc. as may be utilized in carrying automotive fluids including gasoline, oil, coolant, etc. are encompassed herein. Moreover, tubular components as may be blow molded from the thermoplastic composition are not limited to those found in either automotive or oil and gas field applications. Referring to FIG. 16, one embodiment of a single layer conduit 120 blow molded from the thermoplastic composition is shown. As shown, the conduit 120 extends in multiple directions leading to a relatively complex shape. For instance, before the thermoplastic composition can solidify, the angular displacements as shown in FIG. 16 can be formed into the part. The conduit 120 includes angular displacement changes at 122, 124 and 126. The conduit may be, for instance, a component that may be used in the exhaust system of a vehicle or the fuel system of the vehicle. For example, conduit 120 can form a filler tube for conveying gasoline from a fuel filler neck to a gasoline tank.

Figure 17:
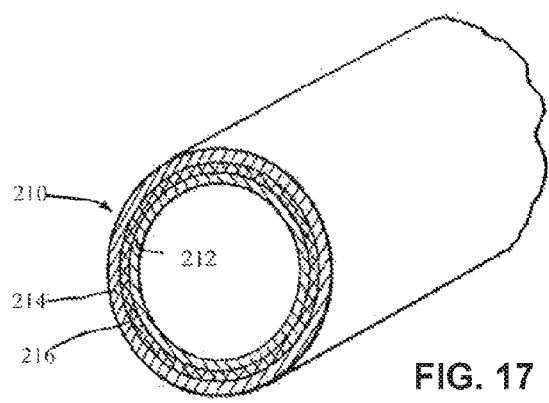
FIG. 17 is a multi-layer tubular member, one or more layers of which may be formed from the thermoplastic composition.

As discussed above, the tubular member that incorporates the thermoplastic composition can be a multi-layered tubular member. FIG. 17 illustrates a multi-layered tubular member 210 as may incorporate the thermoplastic composition in one or more blow molded layers of the tubular member 210. For example, the inner layer 212 can be formed of the blow molded thermoplastic composition that exhibits high impact strength characteristics under a wide temperature range and that is substantially inert to the materials to be carried within the tubular member 210.

The outer layer 214 and the intermediate layer 216 can include a thermoplastic composition that is the same or different than the thermoplastic composition that forms the inner layer. In addition, the outer layers of the multi-layered tubular member may be blow molded or formed according to a different formation technique. However, it should be understood that layers of the multilayer tubular member may be formed of a plurality of different materials, and only one or multiple layers of the member may be formed of the thermoplastic composition. For example, in one embodiment the intermediate layer 216 can exhibit high resistance to pressure and mechanical effects. By way of example, layer 216 can be formed of polyamides from the group of homopolyamides, co-polyamides, their blends or mixtures which each other or with other polymers. Alternatively, layer 216 can be formed of a fiber reinforced material such as a fiber-reinforced resin composite or the like. For example, a polyaramid (e.g., Kevlar®) woven mat can be utilized to form an intermediate layer 216 that is highly resistant to mechanical assaults. Such an intermediate layer may be formed over the pre-formed blow molded inner layer or may be formed first, and the inner layer may be formed according to a blow molding method on the interior surface of the first-formed layer.

Outer layer 214 can provide protection from external assaults as well as provide insulative or other desirable characteristics to the tubular member. For example, a multi-layer hose can include an outer layer 214 formed from an adequate kind of rubber material having high levels of chipping, weather, flame and cold resistance. Examples of such materials include thermoplastic elastomer such as polyamide thermoplastic elastomer, polyester thermoplastic elastomer, polyolefin thermoplastic elastomer, and styrene thermoplastic elastomer. Suitable materials for outer layer 214 include, without limitation, ethylene-propylene-diene terpolymer rubber, ethylene-propylene rubber, chlorosulfonated polyethylene rubber, a blend of acrylonitrile-butadiene rubber and polyvinyl chloride, a blend of acrylonitrile-butadiene rubber and ethylene-propylene-diene terpolymer rubber, and chlorinated polyethylene rubber.

Outer layer 214 can alternatively be formed of a harder, less flexible material, such as a polyolefin, polyvinylchloride, or a high density polyethylene, a fiber reinforced composite material such as a glass fiber composite or a carbon fiber composite, or a metal material such as a steel jacket. Moreover, the outer layer, as with other layers of a multi-layer member 210, may be blow molded or may be formed according to another formation technique.

Of course, a multi-layer tubular member is not limited to three layers, and may include two, four, or more distinct layers. A multi-layer tubular member may further contain one or more adhesive layers formed from adhesive materials such as, for example, polyester polyurethanes, polyether polyurethanes, polyester elastomers, polyether elastomers, polyamides, polyether polyamides, polyether polyimides, functionalized polyolefins, and the like.

Figure 18:
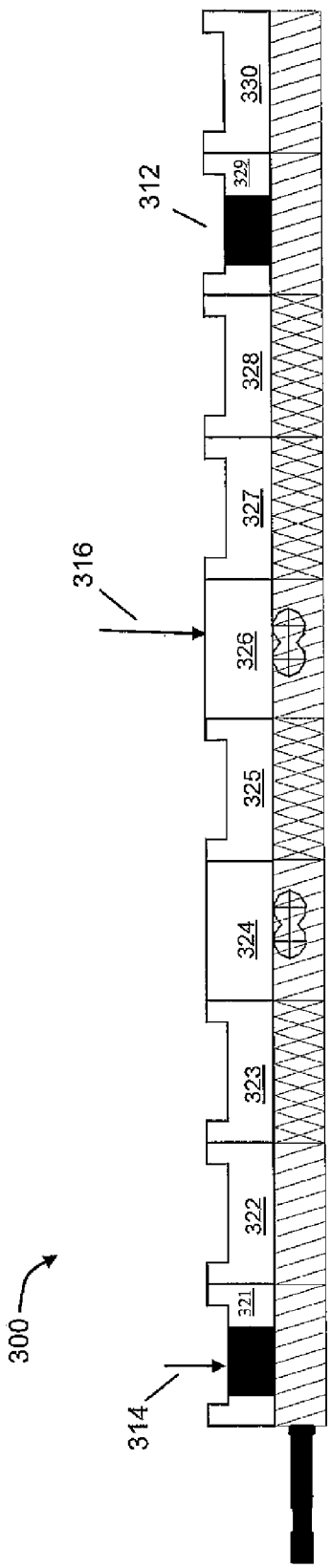
FIG. 18 is a schematic representation of a process for forming the thermoplastic composition.

The blow molded thermoplastic composition can exhibit both flexibility and high strength characteristics. FIG. 18 schematically illustrates a process that can be used in forming the thermoplastic composition. As illustrated, the components of the thermoplastic composition may be melt-kneaded in a melt processing unit such as an extruder 300. Extruder 300 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 300 that includes multiple zones or barrels. In the illustrated embodiment, extruder 300 includes 10 barrels numbered 321-330 along the length of the extruder 300, as shown. Each barrel 321-330 can include one or more feed lines 314, 316, vents 312, temperature controls, etc. that can be independently operated. A general purpose screw design can be used to melt process the thermoplastic composition. By way of example, a thermoplastic composition may be melt mixed using a twin screw extruder such as a Coperion co-rotating fully intermeshing twin screw extruder.

In forming a thermoplastic composition, a polyarylene sulfide can be fed to the extruder 300 at a main feed throat 314. For instance, the polyarylene sulfide may be fed to the main feed throat 314 at the first barrel 321 by means of a metering feeder. The polyarylene sulfide can be melted and mixed with the other components of the composition as it progresses through the extruder 300. The impact modifier can be added to the composition in conjunction with the thermoplastic composition at the main feed throat 314 or downstream of the main feed throat, as desired.

At a point downstream of the main feed throat 314, and following addition of the impact modifier to the composition, the crosslinking agent can be added to the composition. For instance, in the illustrated embodiment, a second feed line 316 at barrel 326 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

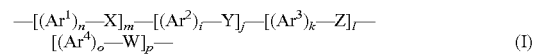

$$-[(Ar^1)_n-X]_m-[(Ar^2)_i-Y]_j-[(Ar^3)_k-Z]_l-$$
$$[(Ar^4)_o-W]_p- \quad (I)$$

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from $-SO_2-$, $-S-$, $-SO-$, $-CO-$, $-O-$, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —$(C_6H_4$—$S)_n$—(wherein n is an integer of 1 or more) as a component thereof.

The polyarylene sulfide may be synthesized prior to forming the thermoplastic composition, though this is not a requirement of a process. For example, a polyarylene sulfide can be purchased from known suppliers. For instance Fortron® polyphenylene sulfide available from Ticona of Florence, Ky., USA can be purchased and utilized as the polyarylene sulfide. When the polyarylene sulfide is synthesize, synthesis techniques as are generally known in the art may be utilized. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

(II)

and segments having the structure of formula (III):

(III)

or segments having the structure of formula (IV):

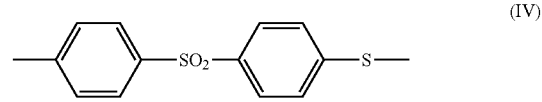

(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The thermoplastic composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

The polyarylene sulfide may be of any suitable molecular weight and melt viscosity, generally depending upon the final application intended for the thermoplastic composition. For instance, the melt viscosity of the polyarylene sulfide may be a low viscosity polyarylene sulfide, having a melt viscosity of less than about 500 poise, a medium viscosity polyarylene sulfide, having a melt viscosity of between about 500 poise and about 1500 poise, or a high melt viscosity polyarylene sulfide, having a melt viscosity of greater than about 1,500 poise, as determined in accordance with ISO Test No. 11443 at a shear rate of 1200 s$^{-1}$ and at a temperature of 310° C.

According to one embodiment, the polyarylene sulfide can be functionalized to further encourage bond formation between the polyarylene sulfide and the impact modifier, which can further improve distribution of the impact modifier throughout the composition and further prevent phase separation. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the thermoplastic composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for further processing, and the overall halogen content of the low melt viscosity polyarylene sulfide can be quite low. A thermoplastic composition that exhibits excellent strength and degradation resistance in addition to low halogen content can be advantageous as low halogen content polymeric materials are becoming increasingly desired due to environmental concerns. In one embodiment, the thermoplastic composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

$$R^1-S-S-R^2$$

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl(meth)acrylate-maleic anhydride terpolymers, ethylene-alkyl(meth)acrylate-glycidyl(meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

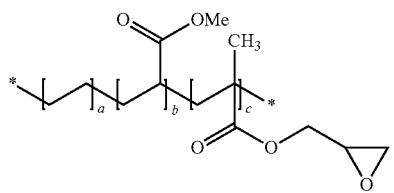

wherein, a, b, and c are 1 or greater.

In another embodiment the impact modifier can be a random copolymer of ethylene, ethyl acrylate and maleic anhydride having the following structure:

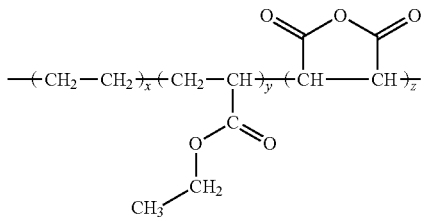

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An a-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 18, the impact modifier can be added to the composition in conjunction with the polyarylene sulfide at the main feed throat 314 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the thermoplastic composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes. (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The thermoplastic composition may generally include the crosslinking agent in an amount from about 0.05 wt. % to about 2 wt. % by weight of the thermoplastic composition, from about 0.07 wt. % to about 1.5 wt. % by weight of the thermoplastic composition, or from about 0.1 wt. % to about 1.3 wt. %.

The crosslinking agent can be added to the melt processing unit following mixing of the polyarylene sulfide and the impact modifier. For instance, as illustrated in FIG. 18, the crosslinking agent can be added to the composition at a downstream location 316 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the $L/L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

The composition can also include one or more additives as are generally known in the art. For example, one or more fillers can be included in the composition. One or more fillers may generally be included in the composition an amount of from about 5 wt. % to about 70 wt. %, or from about 20 wt. % to about 65 wt. % by weight of the composition.

The filler can be added to the thermoplastic composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the thermoplastic composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the composition. In general, particulate fillers can encompass any particulate material having a median particle size of less than about 750 μm, for instance less than about 500 μm, or less than about 100 μm. In one embodiment, a particulate filler can have a median particle size in the range of from about 3 μm to about 20 μm. In addition, a particulate filler can be solid or hollow, as is known. Particulate fillers can also include a surface treatment, as is known in the art.

Particulate fillers can encompass one or more mineral fillers. For instance, the thermoplastic composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

A filler can be an electrically conductive filler such as, without limitation, carbon black, graphite, graphene, carbon fiber, carbon nanotubes, a metal powder, and so forth. In those embodiments in which the thermoplastic composition includes electrically conductive fillers, for instance when the thermoplastic composition is utilized in forming a fuel line, adequate electrically conductive filler can be included such that the composition has a volume specific resistance of equal to or less than about $10^9$ ohms cm.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the thermoplastic composition can include a UV stabilizer as an additive. For instance, the thermoplastic composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit.

One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a thermoplastic composition is one or more colorants as are generally known in the art. For instance, the composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes Pigments that can be incorporated in a thermoplastic composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the thermoplastic composition can encompass, without limitation, antimicrobials, lubricants, pigments or other colorants, impact modifiers, antioxidants, stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the thermoplastic composition in conventional amounts and according to conventional processing techniques, for instance through addition to the thermoplastic composition at the main feed throat. Beneficially, the thermoplastic composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the thermoplastic composition, the composition is thoroughly mixed in the remaining section(s) of the extruder and extruded through a die. The final extrudate can be pelletized and stored prior to blow molding or may be directly fed to the blow molding process.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Formation and Test Methods

Injection Molding Process: Tensile bars are injection molded to ISO 527-1 specifications according to standard ISO conditions.

Melt Viscosity: All materials are dried for 1.5 hours at 150° C. under vacuum prior to testing. The melt viscosity is measured on a capillary rheometer at 316° C. and 400 sec$^{-1}$ with the viscosity measurement taken after five minutes of constant shear.

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Flexural Properties: Flexural properties including flexural strength and flexural modulus are tested according to ISO Test No. 178 (technically equivalent to ASTM D790). This test is performed on a 64 mm support span. Tests are run on the center portions of uncut ISO 3167 multi-purpose bars. The testing temperature is 23° C. and the testing speed is 2 mm/min.

Deflection Temperature Under Load ("DTUL"): The deflection under load temperature was determined in accordance with ISO Test No. 75-2 (technically equivalent to ASTM D648-07). More particularly, a test strip sample having a length of 80 mm, thickness of 10 mm, and width of 4 mm was subjected to an edgewise three-point bending test in which the specified load (maximum outer fibers stress) was 1.8 Megapascals. The specimen was lowered into a silicone oil bath where the temperature is raised at 2° C. per minute until it deflects 0.25 mm (0.32 mm for ISO Test No. 75-2).

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Unnotched Charpy Impact Strength: Unnotched Charpy properties are tested according to ISO Test No. 180 (technically equivalent to ASTM D256). The test is run using a Type 1 specimen (length of 80 mm, width of 10 mm and thickness of 4 mm). Specimens are cut from the center of a multi-purpose bare using a single tooth milling machine. The testing temperature is 23° C.

Izod Notched Impact Strength: Notched Izod properties are tested according to ISO Test No. 180 (technically equivalent to ASTM D256, Method A). This test is run using a Type A notch. Specimens are cut from the center of a multi-purpose bar using a single tooth milling machine. The testing temperature is 23° C.

Density and Specific Gravity: Density was determined according to ISO Test No. 1183 (technically equivalent to ASTM D792). The specimen was weighed in air then weighed when immersed in distilled water at 23° C. using a sinker and wire to hold the specimen completely submerged as required.

Vicat softening temperature: Vicat Softening temperature is determined according to method A, with a load of 10 N and according to method B with a load of 50 N as described in ISO Test No. 306 (technically equivalent to ASTM D1525), both of which utilized a heating rate of 50 K/h.

Water absorption is determined according to ISO Test No. 62. The test specimens are immersed in distilled water at 23° C. until the water absorption essentially ceases (23° C./sat).

Complex viscosity: Complex viscosity is determined by a Low shear sweep (ARES) utilizing an ARES-G2 (TA Instruments) testing machine equipped with 25 mm SS parallel plates and using TRIOS software. A dynamic strain sweep was performed on a pellet sample prior to the frequency sweep, in order to find LVE regime and optimized testing condition. The strain sweep was done from 0.1% to 100%, at a frequency 6.28 rad/s. The dynamic frequency sweep for each sample was obtained from 500 to 0.1 rad/s, with strain amplitude of 3%. The gap distance was kept at 1.5 mm for pellet samples. The temperature was set at 310° C. for all samples.

Figure 19:
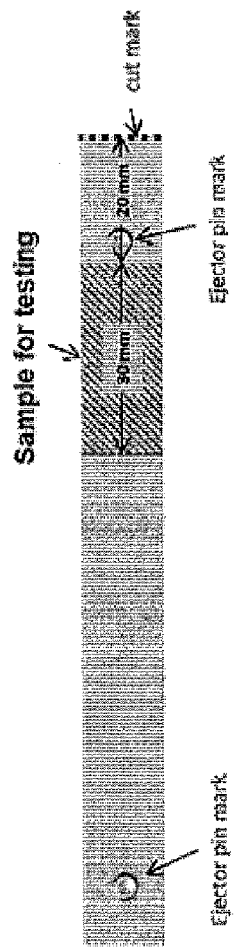
FIG. 19 illustrates the sample used in determination of melt strength and melt elongation of thermoplastic compositions described herein.

Melt strength and melt elongation is performed on ARES-G2 equipped EVF fixture. The flame bar sample was cut as shown in FIG. 19. The same area of flame bar was used for each run, in order to keep the crystallinity of test sample same and thus to minimize the variation between replicates. A transient strain was applied to each sample at 0.2/s rate. At least triplicate run was done for each sample to obtain a representative curve.

Permeation Resistance: The fuel permeation studies were performed on samples according to SAE Testing Method No. J2665. For all samples, stainless-steel cups were used. Injection molded plaques with a diameter of 3 inches (7.6 centimeters) were utilized as test samples. The thickness of each sample was measured in 6 different areas. An O-ring Viton® fluoroelastomer was used as a lower gasket between cup flange and sample (Purchased from McMaster-Carr, cat# 9464K57, A75). A flat Viton® fluoroelastomer (Purchased from McMaster-Carr, cat# 86075K52, 1/16" thickness, A 75) was die-cut to 3 inch (7.6 cm) OD and 2.5 inch (6.35 cm) ID, and used as the upper gasket between the sample and the metal screen. The fuel, about 200 ml, was poured into the cup, the cup apparatus was assembled, and the lid was finger-tightened. This was incubated in a 40° C. oven for 1 hour, until the vapor pressure equilibrated and the lid was tightened to a torque 15 in-lb. The fuel loss was monitored gravimetrically, daily for the first 2 weeks followed by twice a week for the rest of the testing period. A blank run was done in the same manner with an aluminum disk (7.6 cm diameter, 1.5 mm thickness) and the result was subtracted from the samples. All samples were measured in duplicate. The normalized permeation rate was calculated following an equilibration period. The permeation rate for each sample was obtained from the slope of linear regression fitting of daily weight loss (gm/day). The normalized permeation rate was calculated by dividing the permeation rate by the effective permeation area and multiplying by average thickness of specimen. The average permeation rates are reported.

EXAMPLE 1

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Disulfide: 2,2-dithiodibenzoic acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the disulfide was fed using a gravimetric feeder at barrel 6. Materials were further mixed then extruded through a strand die. The strands were water-quenched in a bath to solidify and granulated in a pelletizer.

Compositions of the samples are provided in Table 1, below. Amounts are provided as weight percentages based upon the weight of the sample.

TABLE 1

| Component | Addition Point | Sample 1 | Sample 2 |
|---|---|---|---|
| Lubricant | main feed | 0.3 | 0.3 |
| Disulfide | barrel 6 | | 1.0 |
| Impact Modifier | main feed | 25.0 | 25.0 |
| Polyarylene Sulfide | main feed | 74.7 | 73.7 |
| Total | | 100.0 | 100.0 |

Following formation, samples were tested for a variety of physical characteristics. Results are provided in Table 2, below.

TABLE 2

| | Sample 1 | Sample 2 |
|---|---|---|
| Melt Viscosity (poise) | 3328 | 4119 |
| Tensile Modulus (MPa) | 1826 | 1691 |
| Tensile Break Stress (MPa) | 43.73 | 44.98 |
| Tensile Break Strain (%) | 96.37 | 135.12 |
| Std. Dev. | 39.07 | 34.40 |
| Notched Charpy Impact Strength at 23° C. (kJ/m$^2$) | 61.03 | 53.00 |

Samples were annealed at 230° C. for 2 hours and re-tested for physical characteristics. Results are provided in Table 3, below.

TABLE 3

| | Sample 1 | Sample 2 |
|---|---|---|
| Tensile Modulus (MPa) | 1994.00 | 1725.00 |
| Tensile Break Stress (MPa) | 45.04 | 45.20 |
| Tensile Break Strain (%) | 58.01 | 73.76 |
| Std. Dev. | 6.60 | 4.78 |

As can be seen, Sample 2 exhibited better tensile elongation and lower modulus before and after annealing. However, no improvement in impact strength was seen, which is believed to be due to a chain scission reaction between the disulfide and the polypropylene sulfide.

EXAMPLE 2

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. The disulfide was fed using a gravimetric feeder at various locations in the extruder; at the main feed throat, at barrel 4 and barrel 6. The crosslinking agent was fed at barrel 6. Materials were further mixed then extruded through a strand die. The strands were water-quenched in a bath to solidify and granulated in a pelletizer.

Comparative Samples 3 and 4 were formed of the same composition and compounded by use of a different screw design.

TABLE 4

| | Addition Point | 3 | 4 | 5 | 6 | 7 | 8 | 9 | 10 |
|---|---|---|---|---|---|---|---|---|---|
| Lubricant | main feed | 0.3 | 0.3 | 0.3 | 0.3 | 0.3 | 0.3 | 0.3 | 0.3 |
| Crosslinking Agent | barrel 6 | — | — | 0.5 | 1.0 | 1.0 | 0.5 | 0.5 | 0.5 |
| Disulfide | main feed | — | — | — | — | — | 0.30 | — | — |
| Disulfide | barrel 4 | — | — | — | — | — | — | 0.3 | — |
| Disulfide | barrel 6 | — | — | — | — | — | — | — | 0.3 |
| Impact Modifier | main feed | 15.0 | 15.0 | 15.0 | 15.0 | 10.0 | 15.0 | 15.0 | 15.0 |
| Polyarylene Sulfide | main feed | 84.7 | 84.7 | 84.2 | 83.7 | 88.7 | 83.9 | 83.9 | 83.9 |
| Total | | 100.0 | 100.0 | 100.0 | 100.0 | 100.0 | 100.0 | 100.0 | 100.0 |

Following formation, tensile bars were formed and tested for a variety of physical characteristics. Results are provided in Table 5, below.

FIG. 20 illustrates the relationship of notched Charpy impact strength over temperature change for Sample 3 and for Sample 6. As can be seen, the thermoplastic composition of Sample 6 exhibits excellent characteristics over the entire

TABLE 5

|  | Sample 3 | Sample 4 | Sample 5 | Sample 6 | Sample 7 | Sample 8 | Sample 9 | Sample 10 |
|---|---|---|---|---|---|---|---|---|
| Melt Viscosity (poise) | 2423 | — | 2659 | 2749 | 2067 | 2349 | 2310 | 2763 |
| Density (g/cm$^3$) | — | 1.28 | — | 1.25 | — | — | — | — |
| Tensile Modulus (MPa) | 2076 | 2800 | 2177 | 2207 | 2551 | 1845 | 2185 | 2309 |
| Tensile Break Stress (MPa) | 46.13 | — | 45.40 | 48.27 | 51.71 | 46.47 | 47.16 | 47.65 |
| Tensile Break Strain (%) | 33.68 | 25 | 43.97 | 35.94 | 26.90 | 47.51 | 40.85 | 63.85 |
| Elongation at Yield (%) | 5.17 | 5 | 5.59 | 7.49 | 4.5 | 11.78 | 6.94 | 7.00 |
| Yield Stress (MPa) | 51.07 | 52 | 50.76 | 51.62 | 59.63 | 51.07 | 52.56 | 51.88 |
| Notched Charpy Impact Strength at 23° C. (kJ/m$^2$) | 22.30 | 30 | 23.90 | 39.40 | 14.80 | 12.50 | 19.70 | 39.90 |
| Notched Charpy Impact Strength at −30° C. (kJ/m$^2$) | 7.8 | 7 | — | 10 | — | — | — | 10.8 |
| DTUL (° C.) | — | 100 | — | 102 | — | — | — | — |
| Melt Temp. (° C.) | 280 | 280 | 280 | 280 | 280 | 280 | 280 | 280 |
| Water absorption (%) | — | 0.05 | — | 0.05 | — | — | — | — |

Samples were annealed at 230° C. for 2 hours and re-tested for physical characteristics. Results are provided in Table 6, below.

course of the temperature change, with a higher rate of increase in impact strength with temperature change as compared to the comparison material.

TABLE 6

|  | Sample 3 | Sample 4 | Sample 5 | Sample 6 | Sample 7 | Sample 8 | Sample 9 | Sample 10 |
|---|---|---|---|---|---|---|---|---|
| Tensile Modulus (MPa) | 2383 | — | 2339 | 2279 | 2708 | 2326 | 2382 | 2491 |
| Tensile Break Stress (MPa) | 52.70 | — | 53.96 | 53.11 | 61.10 | 56.74 | 54.81 | 55.25 |
| Tensile Break Strain (%) | 29.42 | — | 20.97 | 35.76 | 20.34 | 31.37 | 41.23 | 49.03 |
| Std. Dev. | 6.84 | — | 6.95 | 6.66 | 5.40 | 2.83 | 2.65 | 3.74 |

As can be seen, the highest tensile elongation and highest impact strength were observed for Sample 10, which includes both the crosslinking agent and the disulfide added at the same point downstream during processing.

FIG. 21 is a scanning electron microscopy image of the polyarylene sulfide used in forming the sample 3 composition (FIG. 21A) and the Sample 6 composition (FIG. 21B). As can be seen, there is no clear boundary between the polyarylene sulfide and the impact modifier in the composition of FIG. 21B (sample 6).

Tensile bar test specimens of samples 3, 6, and 10 were immersed in 10 wt. % sulfuric acid for 500 hours at either 40° C. or 80° C. Tensile properties and impact properties were measured before and after the acid exposure. Results are summarized in Table 7 below.

TABLE 7

|  | Sample 3 | Sample 6 | Sample 10 |
| --- | --- | --- | --- |
| Initial properties | | | |
| Tensile Modulus (MPa) | 2076 | 2207 | 2309 |
| Tensile Break Stress (MPa) | 46.13 | 48.27 | 47.65 |
| Tensile Break Strain (%) | 33.68 | 35.94 | 63.85 |
| Charpy notched impact strength at 23° C. (kJ/m$^2$) | 22.30 | 39.40 | 39.90 |
| Properties after 500 hours exposure in sulfuric acid at 40° C. | | | |
| Tensile Modulus (MPa) | 2368 | 2318 | 2327 |
| Tensile Break Stress (MPa) | 48.83 | 48.48 | 48.53 |
| Tensile Break Strain (%) | 10.99 | 28.28 | 30.05 |
| Charpy notched impact strength at 23° C. (kJ/m$^2$) | 18.4 | 33.6 | 35.9 |
| Loss in Charpy notched impact strength (%) | 18 | 15 | 15 |
| Properties after 500 hour exposure in sulfuric acid at 80° C. | | | |
| Tensile Modulus (MPa) | 2341 | 2356 | 2354 |
| Tensile Break Stress (MPa) | 49.61 | 48.04 | 48.86 |
| Tensile Break Strain (%) | 10.60 | 19.88 | 26.32 |
| Charpy notched impact strength at 23° C. (kJ/m$^2$) | 9.2 | 31.0 | 34.0 |
| Loss in Charpy notched impact strength (%) | 59 | 21 | 15 |

Figure 22:
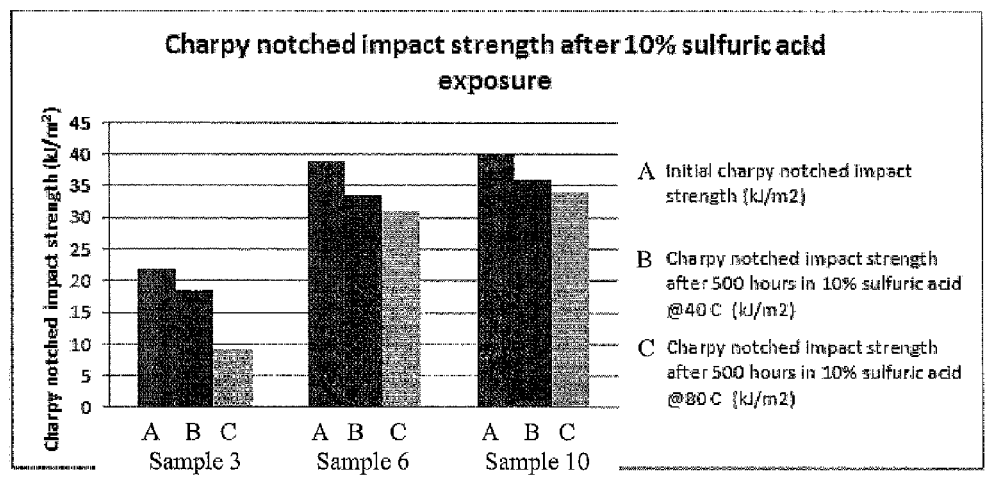
FIG. 22 compares the effect of sulfuric acid exposure on strength characteristics of thermoplastic compositions as described herein and a comparison composition.

The results in the change in Charpy notched impact strength over time during exposure to the acid solution at an elevated temperature are illustrated in FIG. 22. As can be seen, the relative loss of strength of samples 6 and 10 is much less than the comparison sample.

EXAMPLE 3

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at the main feed throat and at barrel 6. Materials were further mixed then extruded through a strand die. The strands were water-quenched in a bath to solidify and granulated in a pelletizer.

Compositions of the samples are provided in Table 8, below. Amounts are provided as weight percentages based upon the weight of the sample.

TABLE 8

| Component | Addition Point | Sample 11 | Sample 12 | Sample 13 | Sample 14 |
| --- | --- | --- | --- | --- | --- |
| Lubricant | main feed | 0.3 | 0.3 | 0.3 | 0.3 |
| Crosslinking Agent | main feed | — | 0.5 | 1.0 | — |
| Crosslinking Agent | barrel 6 | — | — | — | 1.0 |

TABLE 8-continued

| Component | Addition Point | Sample 11 | Sample 12 | Sample 13 | Sample 14 |
| --- | --- | --- | --- | --- | --- |
| Impact Modifier | main feed | 15.0 | 15.0 | 15.0 | 15.0 |
| Polyarylene Sulfide | main feed | 84.7 | 84.2 | 83.7 | 83.7 |
| Total | | 100.0 | 100.0 | 100.0 | 100.0 |

Following formation, tensile bars formed of the samples were tested for a variety of physical characteristics. Results are provided in Table 9, below.

TABLE 9

|  | Sample 11 | Sample 12 | Sample 13 | Sample 14 |
| --- | --- | --- | --- | --- |
| Melt Viscosity (poise) | 2649 | 2479 | 2258 | 3778 |
| Tensile Modulus (MPa) | 2387 | 2139 | 2150 | 1611 |
| Tensile Break Stress (MPa) | 46.33 | 49.28 | 51.81 | 42.44 |
| Tensile Break Strain (%) | 24.62 | 22.60 | 14.45 | 53.62 |
| Std. Dev. | 9.19 | 1.51 | 2.23 | 1.90 |
| Notched Charpy Impact Strength at 23° C. (kJ/m$^2$) | 27.50 | 8.50 | 6.00 | 39.30 |
| Std. Dev. | 2.7 | 1.10 | 0.60 | 2.10 |

As can be seen, upstream feed of the crosslinking agent decreased the impact properties of the composition, while downstream feed increased the tensile elongation by 118% and room temperature impact strength by 43%.

EXAMPLE 4

Materials as described in Example 1 were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 10, below. Amounts are provided as weight percentages based upon the weight of the sample.

TABLE 10

| Component | Addition Point | Sample 15 | Sample 16 | Sample 17 | Sample 18 |
| --- | --- | --- | --- | --- | --- |
| Lubricant | main feed | 0.3 | 0.3 | 0.3 | 0.3 |
| Crosslinking Agent | barrel 6 | 1.0 | 1.7 | 1.0 | 1.7 |
| Impact Modifier | main feed | 25.0 | 25.0 | 15.0 | 15.0 |
| Polyarylene Sulfide | main feed | 73.7 | 73.0 | 83.7 | 83.0 |
| Total | | 100.0 | 100.0 | 100.0 | 100.0 |

Following formation, tensile bars formed of the samples were tested for a variety of physical characteristics. Results are provided in Table 11, below.

TABLE 11

|  | Sample 15 | Sample 16 | Sample 17 | Sample 18 |
|---|---|---|---|---|
| Melt Viscosity (poise) | 4255 | 4198 | 2522 | 2733 |
| Density (g/cm$^3$) | 1.2 | — | — | — |
| Tensile Modulus (MPa) | 1582.00 | 1572.00 | 2183.00 | 2189.00 |
| Tensile Break Stress (MPa) | 45.59 | 46.29 | 48.98 | 49.26 |
| Tensile Break Strain (%) | 125.92 | 116.40 | 66.13 | 48.24 |
| Std. Dev. | 19.79 | 9.97 | 15.36 | 7.80 |
| Elongation at Yield (%) | 23 | — | — | — |
| Yield Stress (MPa) | 42 | — | — | — |
| Flex Modulus (MPa) | 1946.00 | 1935.00 | 2389.00 | 2408.00 |
| Flexural Stress @3.5% (MPa) | 48.30 | 48.54 | 68.55 | 68.12 |
| Notched Charpy Impact Strength at 23° C. (kJ/m$^2$) | 55.60 | 51.80 | 43.60 | 19.10 |
| Std. Dev. | 1.00 | 1.40 | 1.50 | 1.50 |
| Notched Charpy Impact Strength at −30° C. (kJ/m$^2$) | 13 | — | — | — |
| Notched Charpy Impact Strength at −40° C. (kJ/m$^2$) | 13.30 | 12.10 | 11.26 | 8.70 |
| Std. Dev. | 1.50 | 0.90 | 0.26 | 0.50 |
| DTUL (1.8 MPa) (° C.) | 97.20 | 97.60 | 101.70 | 100.90 |
| Water absorption (%) | 0.07 | — | — | — |

EXAMPLE 5

Materials as described in Example 1 were utilized except for the polyarylene sulfide, which was Fortron® 0320 linear polyphenylene sulfide available from Ticona Engineering Polymers of Florence, Ky. Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide and impact modifier were fed to the feed throat in the first barrel by means of a gravimetric feeder. The crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 12, below. Amounts are provided as weight percentages based upon the weight of the sample.

TABLE 12

| Component | Addition Point | Sample 19 | Sample 20 | Sample 21 | Sample 22 | Sample 23 |
|---|---|---|---|---|---|---|
| Crosslinking Agent | barrel 6 | — | — | — | 0.1 | 0.2 |
| Impact Modifier | main feed | — | 1.5 | 3.0 | 1.5 | 3.0 |
| Polyarylene Sulfide | main feed | 100.0 | 98.5 | 97.0 | 98.4 | 96.8 |
| Total |  | 100.0 | 100.0 | 100.0 | 100.0 | 100.0 |

Following formation, tensile bars formed of the samples were tested for a variety of physical characteristics. Results are provided in Table 13, below.

TABLE 13

|  | Sample 19 | Sample 20 | Sample 21 | Sample 22 | Sample 23 |
|---|---|---|---|---|---|
| Melt Viscosity (poise) | 2435 | 2684 | 2942 | 2287 | 1986 |
| Tensile Modulus (MPa) | 3208 | 3207 | 3104 | 3245 | 3179 |
| Tensile Break Stress (MPa) | 67.20 | 72.94 | 59.06 | 63.95 | 60.80 |
| Tensile Break Strain (%) | 2.46 | 4.54 | 11.96 | 6.31 | 11.40 |
| Std. Dev. | 0.32 | 1.11 | 1.24 | 2.25 | 3.53 |
| Flex Modulus (MPa) | 3103.00 | 3173.00 | 3031.00 | 3284.00 | 3156.00 |
| Flexural Stress @3.5% (MPa) | 105.76 | 104.74 | 100.21 | 109.09 | 104.81 |
| Notched Izod Impact Strength at 23° C. (kJ/m$^2$) | 2.90 | 5.20 | 5.60 | 4.10 | 4.30 |
| Std. Dev. | 0.40 | 0.40 | 0.40 | 0.20 | 0.20 |
| DTUL (1.8 MPa) (° C.) | 105.60 | 104.00 | 103.70 | 104.20 | 104.80 |

EXAMPLE 6

Materials utilized to form the compositions included the following:

Polyarylene sulfide: Fortron® 0214 linear polyphenylene sulfide available from Ticona Engineering Polymers of Florence, Ky.

Impact Modifier: LOTADER® 4720—a random terpolymer of ethylene, ethyl acrylate and maleic anhydride available from Arkema, Inc.

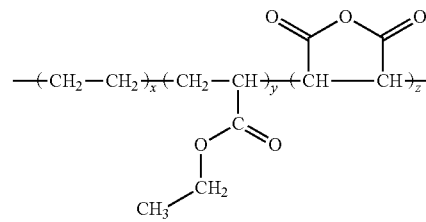 [SMILES: CCCCC(C(=O)OCC)C1C(=O)OC(=O)C1C]

Crosslinking Agent: Hydroquinone

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at the main feed for samples 24 and 25 and at barrel 6 for samples 26 and 27. Materials were further mixed then extruded through a strand die. The strands were water-quenched in a bath to solidify and granulated in a pelletizer.

Compositions of the samples are provided in Table 14, below. Amounts are provided as weight percentages based upon the weight of the sample.

TABLE 14

| Component | Addition Point | Sample 24 | Sample 25 | Sample 26 | Sample 27 | Sample 28 |
|---|---|---|---|---|---|---|
| Lubricant | main feed | 0.3 | 0.3 | 0.3 | 0.3 | 0.3 |
| Crosslinking Agent | barrel 6 | — | — | — | 0.1 | 0.2 |

TABLE 14-continued

| Component | Addition Point | Sample 24 | Sample 25 | Sample 26 | Sample 27 | Sample 28 |
|---|---|---|---|---|---|---|
| Crosslinking Agent | main feed | — | 0.1 | 0.2 | — | — |
| Impact Modifier | main feed | 15.0 | 15.0 | 15.0 | 15.0 | 15.0 |
| Polyarylene Sulfide | main feed | 84.7 | 84.6 | 84.5 | 84.6 | 84.5 |
| Total | | 100.0 | 100.0 | 100.0 | 100.0 | 100.0 |

Following formation, samples were tested for a variety of physical characteristics. Results are provided in Table 15, below.

TABLE 15

| | Sample 24 | Sample 25 | Sample 26 | Sample 27 | Sample 28 |
|---|---|---|---|---|---|
| Melt Viscosity (poise) | 2435 | 2797 | 3251 | 2847 | 2918 |
| Tensile Modulus (MPa) | 2222 | 2164 | 2163 | 2184 | 2145 |
| Tensile Break Stress (MPa) | 52.03 | 45.17 | 46.53 | 45.47 | 46.39 |
| Tensile Break Strain (%) | 36.65 | 50.91 | 63.39 | 38.93 | 41.64 |
| Std. Dev. | 9.09 | 14.9 | 11.88 | 7.62 | 10.42 |
| Elongation at Yield (%) | 5.75 | 5.49 | 5.76 | 5.53 | 5.70 |
| Yield Stress (MPa) | 52.03 | 50.21 | 50.77 | 51.39 | 50.85 |
| Flexural Modulus (MPa) | 2358.00 | 2287.00 | 2286.00 | 2305.00 | 2281.00 |
| Flexural Stress @3.5% (MPa) | 70.51 | 68.25 | 68.03 | 69.23 | 68.23 |
| Notched Charpy Impact Strength at 23° C. (kJ/m$^2$) | 29.80 | 44.60 | 50.60 | 42.30 | 45.90 |
| Std. Dev. | 4.10 | 2.40 | 1.90 | 1.90 | 1.60 |
| Notched Charpy Impact Strength at −40° C. (kJ/m$^2$) | 5.90 | 9.30 | 11.00 | 9.60 | 9.80 |
| Std. Dev. | 1.00 | 0.90 | 1.20 | 0.80 | 1.30 |
| DTUL (1.8 MPa) (° C.) | 99.10 | 93.90 | 98.20 | 100.10 | 99.00 |

EXAMPLE 7

Materials utilized to form the compositions included the following:

Polyarylene sulfide:

PPS1—Fortron® 0203 linear polyphenylene sulfide available from Ticona Engineering Polymers of Florence, Ky.

PPS2—Fortron®0205 linear polyphenylene sulfide available from Ticona Engineering Polymers of Florence, Ky.

PPS3—Fortron®0320 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 16, below. Amounts are provided as weight percentages based upon the weight of the sample.

TABLE 16

| Component | Addition Point | Sample 29 | Sample 30 | Sample 31 | Sample 32 | Sample 33 | Sample 34 |
|---|---|---|---|---|---|---|---|
| Lubricant | main feed | 0.3 | 0.3 | 0.3 | 0.3 | 0.3 | 0.3 |
| Crosslinking Agent | barrel 6 | | 1.0 | | 1.0 | | 1.0 |
| Impact Modifier | main feed | 15.0 | 15.0 | 15.0 | 15.0 | 15.0 | 15.0 |
| PPS1 | main feed | 84.7 | 83.7 | | | | |
| PPS2 | main feed | | | 84.7 | 83.7 | | |
| PPS3 | main feed | | | | | 84.7 | 83.7 |
| Total | | 100.0 | 100.0 | 100.0 | 100.0 | 100.0 | 100.0 |

Following formation, samples were tested for a variety of physical characteristics. Results are provided in Table 17, below.

TABLE 17

| | Sample 29 | Sample 30 | Sample 31 | Sample 32 | Sample 33 | Sample 34 |
|---|---|---|---|---|---|---|
| Tensile Modulus (MPa) | 2292 | 2374 | 2250 | 2427 | 2130 | 2285 |
| Tensile Break Stress (MPa) | 50.92 | 50.18 | 49.18 | 53.22 | 48.01 | 48.08 |
| Tensile Break Strain (%) | 5.79 | 2.84 | 23.79 | 34.73 | 23.55 | 45.42 |
| Std. Dev. | 0.99 | 0.18 | 11.96 | 4.01 | 18.57 | 18.94 |
| Flexural Modulus (MPa) | 2279.00 | 2382.00 | 2257.00 | 2328.00 | 2292.00 | 2294.00 |
| Flexural Stress @3.5% (MPa) | 71.11 | 74.94 | 69.72 | 72.39 | 67.95 | 68.95 |
| Notched Charpy Impact Strength at 23° C. (kJ/m$^2$) | 5.70 | 3.70 | 9.10 | 12.80 | 19.40 | 45.40 |
| Std. Dev. | 0.90 | 0.70 | 0.80 | 1.00 | 2.70 | 7.70 |
| Notched Charpy Impact Strength at −40° C. (kJ/m$^2$) | 3.00 | 2.50 | 5.10 | 5.00 | 5.10 | 8.00 |
| Std. Dev. | 0.70 | 0.30 | 0.60 | 0.30 | 0.40 | 1.00 |
| DTUL (1.8 MPa) (° C.) | 101.00 | 105.50 | 100.00 | 102.90 | 99.90 | 100.40 |

EXAMPLE 8

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 18, below. Amounts are provided as weight percentages based upon the weight of the sample.

TABLE 18

| Component | Addition Point | Sample 35 | Sample 36 | Sample 37 | Sample 38 | Sample 39 | Sample 40 |
|---|---|---|---|---|---|---|---|
| Lubricant | main feed | 0.3 | 0.3 | 0.3 | 0.3 | 0.3 | 0.3 |
| Crosslinking Agent | barrel 6 | | 0.75 | | 1.25 | | 1.75 |
| Impact Modifier | main feed | 15.0 | 15.0 | 25.0 | 25.0 | 35.0 | 35.0 |
| Polyarylene Sulfide | main feed | 84.7 | 83.95 | 74.70 | 73.45 | 64.70 | 62.95 |
| Total | | 100.0 | 100.0 | 100.0 | 100.0 | 100.0 | 100.0 |

Following formation, samples were tested for a variety of physical characteristics. Results are provided in Table 19, below. Sample 39 was not injection moldable.

TABLE 19

| | Sample 35 | Sample 36 | Sample 37 | Sample 38 | Sample 39 | Sample 40 |
|---|---|---|---|---|---|---|
| Melt Viscosity (poise) | 2323 | 2452 | 2955 | 3821 | 2025 | 5462 |
| Tensile Modulus (MPa) | 2281 | 2298 | 2051 | 1721 | — | 1045 |
| Tensile Break Stress (MPa) | 47.09 | 49.09 | 47.29 | 46.18 | — | 39.81 |
| Tensile Break Strain (%) | 28.92 | 36.42 | 97.33 | 110.36 | — | 96.76 |
| Std. Dev. | 6.35 | 3.13 | 53.94 | 8.40 | — | 1.77 |
| Elongation at Yield (%) | 5.28 | 8.58 | 36.00 | 108.19 | — | 95.77 |
| Yield Stress (MPa) | 52.42 | 53.92 | 46.50 | 46.76 | — | 40.43 |
| Flexural Modulus (MPa) | 2388.00 | 2349.00 | 2210.00 | 1750.00 | — | 1209.00 |
| Flexural Stress @3.5% (MPa) | 71.52 | 71.70 | 63.15 | 50.52 | — | 34.41 |
| Notched Charpy Impact Strength at 23° C. (kJ/m$^2$) | 35.15 | 38.40 | 57.00 | 52.70 | — | 52.10 |
| Std. Dev. | 6.22 | 1.50 | 1.40 | 3.40 | — | 2.10 |
| Notched Charpy Impact Strength at −30° C. (kJ/m$^2$) | 8.20 | 10.70 | 8.70 | 18.10 | — | 14.10 |
| Std. Dev. | 1.50 | 1.60 | 0.20 | 0.90 | — | 0.80 |
| Notched Charpy Impact Strength at −40° C. (kJ/m$^2$) | 7.26 | 9.20 | 8.00 | 16.80 | — | 12.47 |
| Std. Dev. | 1.54 | 2.30 | 0.60 | 0.40 | — | 0.92 |
| DTUL (1.8 MPa) (° C.) | 99.90 | 103.60 | 98.10 | 99.30 | — | 92.70 |
| Water absorption (%) | — | — | — | — | — | 0.1 |

EXAMPLE 9

Materials utilized to form the compositions included the following:

Polyarylene sulfide: Fortron® 0214 linear polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Materials were melt mixed using a Coperion co-rotating, fully-intermeshing, twin-screw extruder with an overall L/D of 40 and ten temperature control zones including one at the die. A high shear screw design was used to compound the additives into a resin matrix. The polyarylene sulfide, impact modifier and lubricant were fed to the main feed throat in the first barrel by means of a gravimetric feeder. Upon melting and mixing of the above ingredients, the crosslinking agent was fed using a gravimetric feeder at barrel 6. Materials were further mixed then extruded through a strand die. The strands were water-quenched in a bath to solidify and granulated in a pelletizer.

Compositions of the samples are provided in Table 20, below. Amounts are provided as weight percentages based upon the weight of the sample.

TABLE 20

| Component | Addition Point | Sample 41 | Sample 42 | Sample 43 | Sample 44 |
|---|---|---|---|---|---|
| Lubricant | main feed | 0.3 | 0.3 | 0.3 | 0.3 |
| Crosslinking Agent | barrel 6 | 1.0 | 1.1 | 1.25 | 1.25 |
| Impact Modifier | main feed | 15 | 20 | 25 | 30 |

TABLE 20-continued

| Component | Addition Point | Sample 41 | Sample 42 | Sample 43 | Sample 44 |
|---|---|---|---|---|---|
| Polyarylene Sulfide | main feed | 83.7 | 78.6 | 73.45 | 68.45 |
| Total | | 100.0 | 100.0 | 100.0 | 100.0 |

Following formation, samples were tested for a variety of physical characteristics. Results are provided in Table 21, below.

TABLE 21

| | Sample 41 | Sample 42 | Sample 43 | Sample 44 |
|---|---|---|---|---|
| Specific Gravity (g/cm$^3$) | 1.25 | 1.20 | 1.15 | 1.20 |
| Tensile Modulus (MPa) (50 mm/min) | 2200 | 1600 | 1200 | 1700 |
| Tensile Break Strength (MPa) (50 mm/min) | 50 | 42 | 40 | 46 |
| Elongation at Break (%) (50 mm/min) | 40 | 100 | 90 | 75 |
| Yield Stress (MPa) (50 mm/min) | 55 | 42 | 40 | 48 |
| Yield Strain (%) (50 mm/min) | 9 | 25 | 90 | 15 |
| Flexural Modulus (MPa) | 2200 | 1700 | 1300 | 1900 |
| Flexural Strength @3.5% (MPa) | 68 | 50 | 40 | 56 |
| Notched Charpy Impact Strength at 23° C. (kJ/m$^2$) | 40 | 55 | 50 | 50 |
| Notched Charpy Impact Strength at −30° C. | 10 | 24 | 20 | 20 |
| Unnotched Charpy Impact Strength at 23° C. | Not broken | Not broken | Not broken | Not broken |
| DTUL (1.8 MPa) (° C.) | 102 | 100 | 95 | 100 |
| Water absorption (%) | 0.05 | 0.07 | 0.1 | 0.05 |
| Vicat softening temp. (A10N, ° C.) | 270 | 270 | 270 | 270 |
| Vicat softening temp. (B50N, ° C.) | 200 | 160 | 110 | 180 |
| Complex viscosity (0.1 rad/sec, 310° C.) (kPa/sec) | 79.994 | 289.27 | 455.19 | — |

Figure 23:
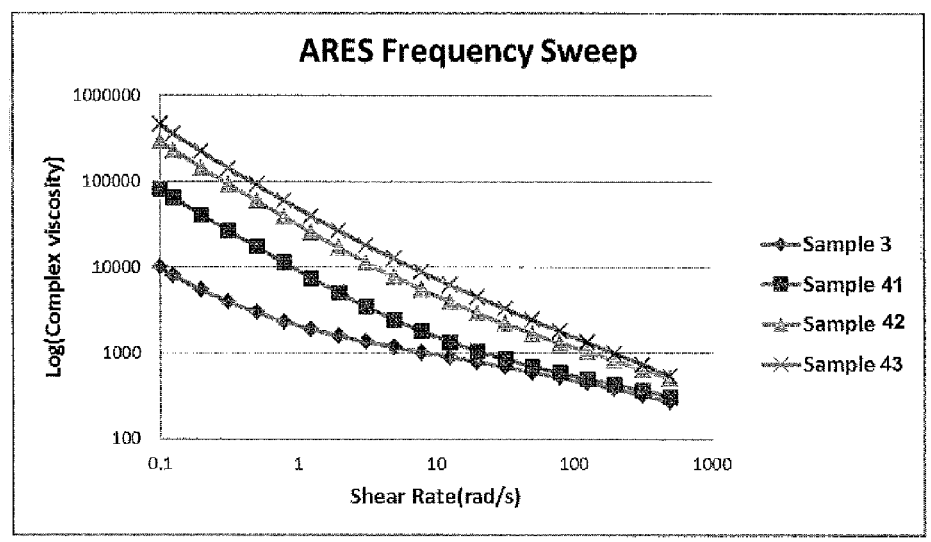
FIG. 23 provides the log of the complex viscosity obtained for thermoplastic compositions described herein as a function of the shear rate.
Figure 24:
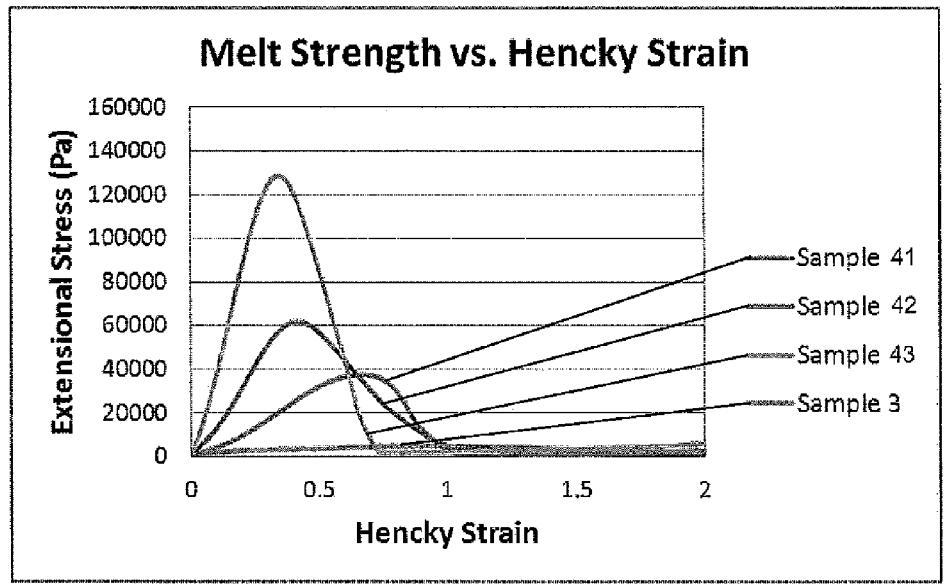
FIG. 24 provides the melt strength of thermoplastic compositions described herein as a function of the Hencky strain.
Figure 25:
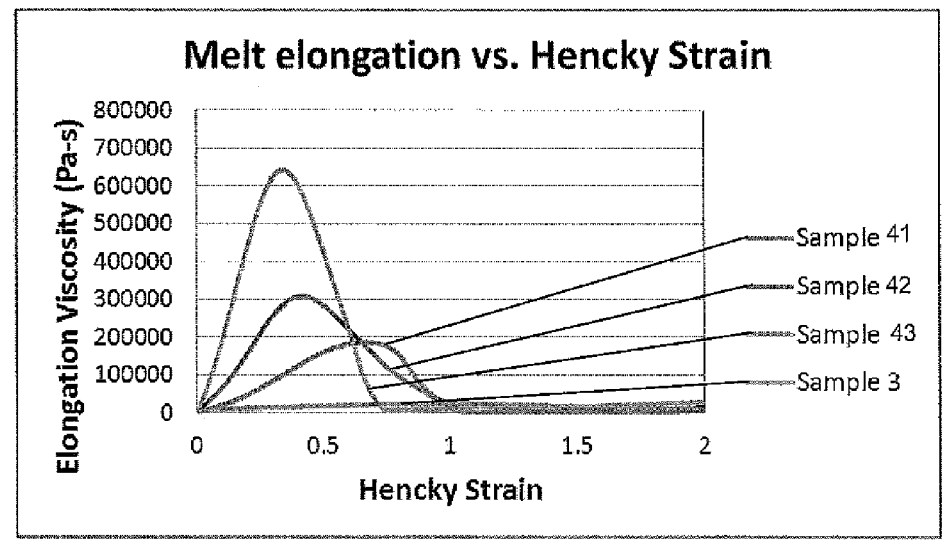
FIG. 25 provides the melt elongation for thermoplastic compositions described herein as a function of Hencky strain.

Samples 41, 42, and 43 were tested to determine complex viscosity as well as melt strength and melt elongation as a function of Hencky strain. As a comparative material, Sample 3 as described in Example 2 was utilized. Samples 41, 42 and 43 were done at 310° C. and sample 3 was done at 290° C. Results are shown in FIG. 23, FIG. 24, and FIG. 25.

EXAMPLE 10

Figure 26:
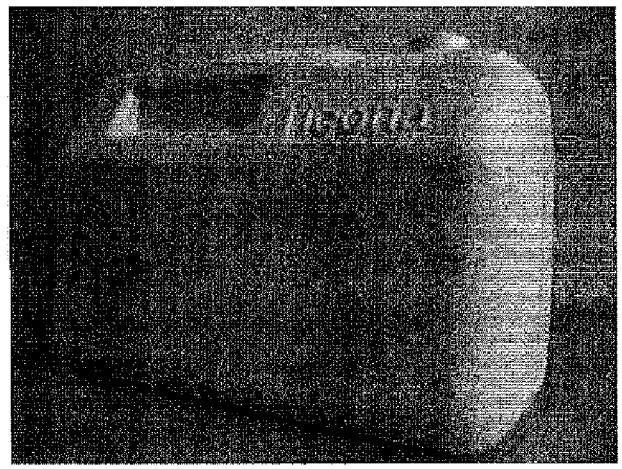
FIG. 26 illustrates a blow molded container formed of the thermoplastic composition.
Figure 27A:
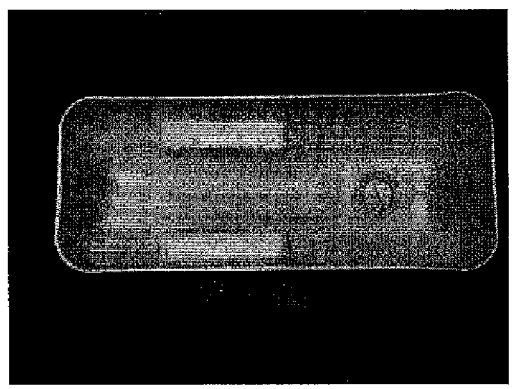
FIG. 27A and FIG. 27B are cross sectional images of the container shown in FIG. 26.
Figure 27B:
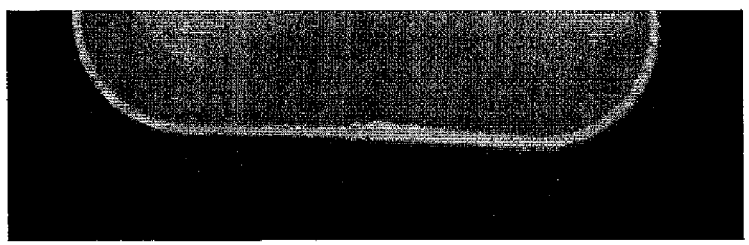

Sample 42 described in Example 9 was utilized to form a blow molded 1.6 gallon tank. The formed tank is illustrated in FIG. 26. Cross sectional views of the tank are presented in FIG. 27A and FIG. 27B. The formed tank has a good outer surface with regard to both visual inspection and feel. As shown in FIG. 27A, an even wall thickness (about 3 mm) was obtained and minimal sag was observed. As shown in FIG. 27B, the pinch-offs formed an excellent geometry.

EXAMPLE 11

Samples 41, 42, and 43 described in Example 9 were tested to determine permeation of various fuels including CE10 (10 wt. % ethanol, 45 wt. % toluene, 45 wt. % iso-octane), CM15A (15 wt. % methanol and 85 wt. % oxygenated fuel), and methanol. Sample No. 4 described in Example 2 was utilized as a comparison material. Two samples of each material were tested.

Table 22, below provides the average sample thickness and effective area for the samples tested with each fuel.

TABLE 22

| Sample | Average Sample Thickness (mm) | Effective area (m$^2$) |
|---|---|---|
| CE10 | | |
| Aluminum blank-1 | 1.50 | 0.00418 |
| Aluminum blank-2 | 1.50 | 0.00418 |
| Sample No. 4-1 | 1.47 | 0.00418 |
| Sample No. 4-2 | 1.45 | 0.00418 |
| Sample No. 41-1 | 1.47 | 0.00418 |
| Sample No. 41-2 | 1.49 | 0.00418 |
| Sample No. 42-1 | 1.47 | 0.00418 |
| Sample No. 42-2 | 1.46 | 0.00418 |
| Sample No. 43-1 | 1.45 | 0.00418 |
| Sample No. 43-2 | 1.47 | 0.00418 |
| CM15A | | |
| Aluminum blank-1 | 1.50 | 0.00418 |
| Aluminum blank-2 | 1.50 | 0.00418 |
| Sample No. 4-1 | 1.48 | 0.00418 |
| Sample No. 4-2 | 1.49 | 0.00418 |
| Sample No. 41-1 | 1.49 | 0.00418 |
| Sample No. 41-2 | 1.50 | 0.00418 |
| Sample No. 42-1 | 1.47 | 0.00418 |
| Sample No. 42-2 | 1.48 | 0.00418 |
| Sample No. 43-1 | 1.46 | 0.00418 |
| Sample No. 43-2 | 1.47 | 0.00418 |
| Methanol | | |
| Aluminum blank-1 | 1.50 | 0.00418 |
| Aluminum blank-2 | 1.50 | 0.00418 |
| Sample No. 4-1 | 1.49 | 0.00418 |
| Sample No. 4-2 | 1.49 | 0.00418 |
| Sample No. 41-1 | 1.49 | 0.00418 |
| Sample No. 41-2 | 1.51 | 0.00418 |
| Sample No. 42-1 | 1.48 | 0.00418 |
| Sample No. 42-2 | 1.47 | 0.00418 |
| Sample No. 43-1 | 1.47 | 0.00418 |
| Sample No. 43-2 | 1.48 | 0.00418 |

Figure 28:
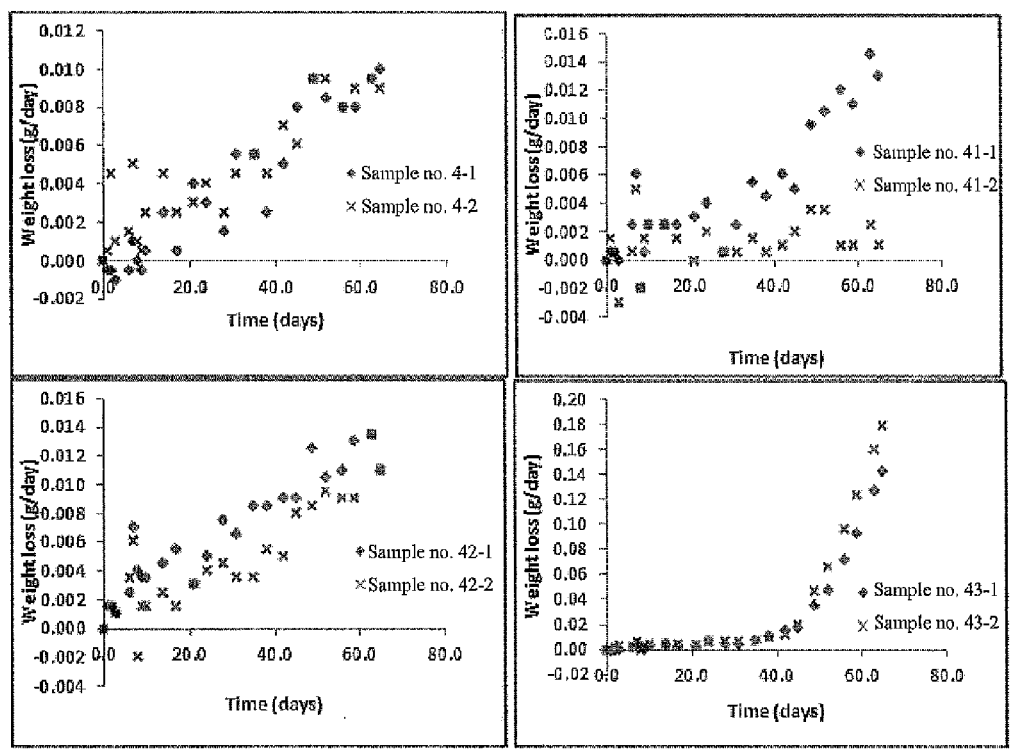
FIG. 28 illustrates the daily weight loss for testing samples in determination of permeation resistance of thermoplastic compositions to CE10 fuel blend.
Figure 29:
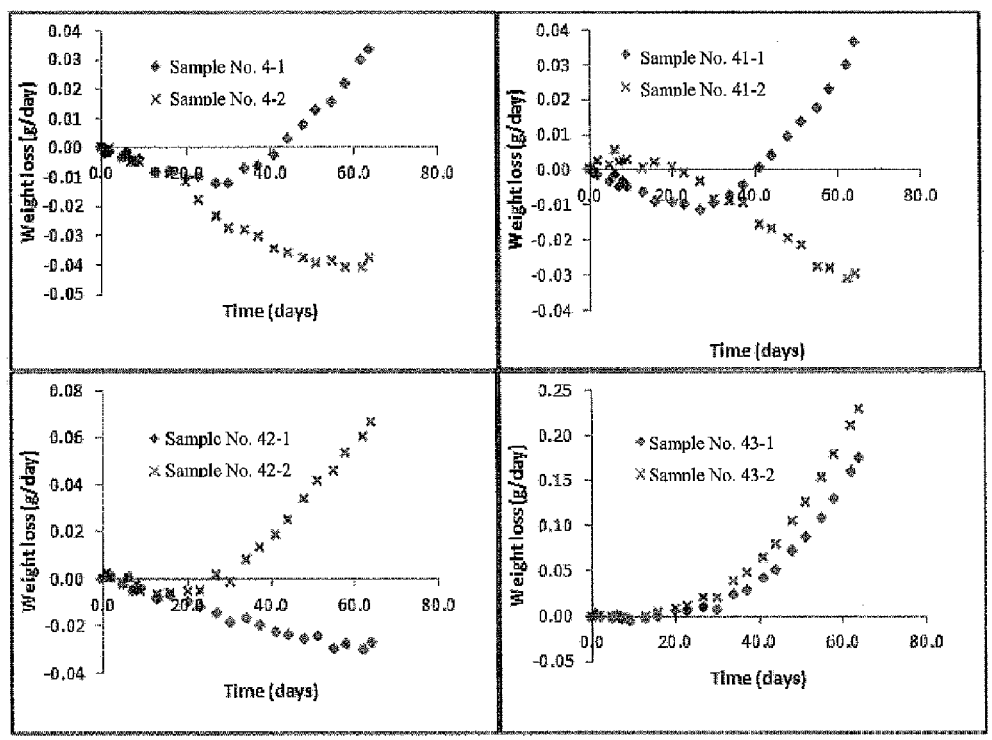
FIG. 29 illustrates the daily weight loss for testing samples in determination of permeation resistance of thermoplastic compositions to CM15A fuel blend.
Figure 30:
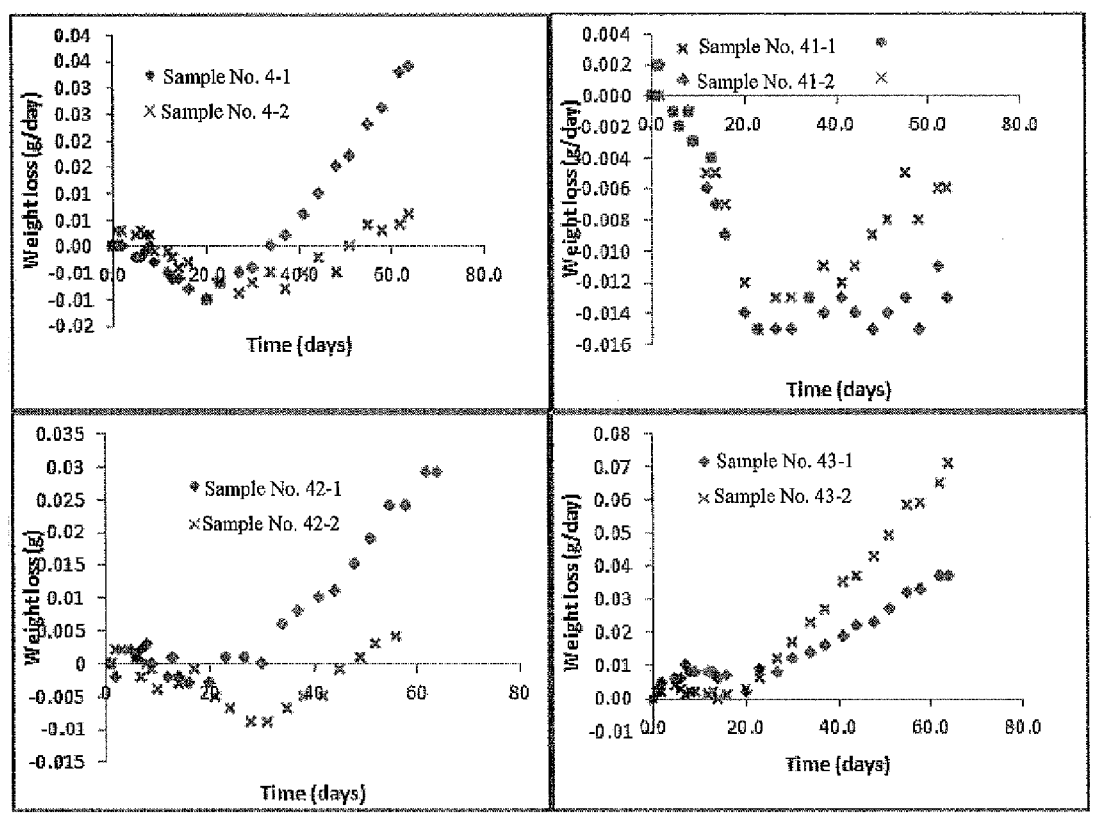
FIG. 30 illustrates the daily weight loss for testing samples in determination of permeation resistance of thermoplastic compositions to methanol.

The daily weight losses for each material and each fuel are shown in FIGS. 28-30. Specifically, FIG. 28 shows the daily weight loss for the samples during the permeation test of CE10, FIG. 29 shows the daily weight loss for the samples during the permeation test of CM15A, and FIG. 30 shows the daily weight loss for the samples during the permeation test of methanol.

The average permeation rates for each sample with each fuel are provided in Table 23. Note that Sample No. 43 takes a longer time to arrive at equilibrium, so the linear regression fitting was generated based on data between days 42 and 65 for this material, while the linear regress fitting was generated for the other materials between days 32 and 65. For methanol, the linear regression fitting was generated based on data between days 20 and 65, but with Sample No. 604, the methanol linear regression fitting was generated based on data between days 30 and 65. Some samples show negative permeability, which is because the weight loss of the sample was lower than that of the aluminum blank.

TABLE 23

| Sample | Normalized permeation (g-mm/day-m²) | Average Normalized permeation (g-mm/day-m²) | Permeation - 3 mm thickness | Average Permeation - 3 mm thickness |
|---|---|---|---|---|
| CE10 | | | | |
| Sample No. 4-1 | 0.06 | 0.05 ± 0.01 | 0.02 | 0.02 ± 0 |
| Sample No. 4-2 | 0.05 | | 0.02 | |
| Sample No. 41-1 | 0.07 | 0.04 ± 0.04 | 0.02 | 0.01 ± 0.01 |
| Sample No. 41-2 | 0.01 | | 0.00 | |
| Sample No. 42-1 | 0.06 | 0.06 ± 0 | 0.02 | 0.02 ± 0 |
| Sample No. 42-2 | 0.06 | | 0.02 | |
| Sample No. 43-1 | 2020 | 2.51 ± 0.43 | 0.73 | 0.84 ± 0.14 |
| Sample No. 43-2 | 2.81 | | 0.94 | |
| CM15A | | | | |
| Sample No. 4-1 | 0.49 | 0.18 ± 0.44 | 0.16 | 0.06 ± 0.15 |
| Sample No. 4-2 | −0.13 | | −0.04 | |
| Sample No. 41-1 | 0.50 | 0.11 ± 0.55 | 0.17 | 0.04 ± 0.18 |
| Sample No. 41-2 | −0.27 | | −0.09 | |
| Sample No. 42-1 | −0.13 | 0.27 ± 0.58 | −0.04 | 0.09 ± 0.19 |
| Sample No. 42-2 | 0.68 | | 0.23 | |
| Sample No. 43-1 | 2.04 | 2.29 ± 0.35 | 0.68 | 0.76 ± 0.12 |
| Sample No. 43-2 | 2.53 | | 0.84 | |
| Methanol | | | | |
| Sample No. 4-1 | 0.37 | 0.25 ± 0.18 | 0.12 | 0.08 ± 0.06 |
| Sample No. 4-2 | 0.13 | | 0.04 | |
| Sample No. 41-1 | 0.02 | 0.05 ± 0.05 | 0.01 | 0.02 ± 0.02 |
| Sample No. 41-2 | 0.08 | | 0.03 | |
| Sample No. 42-1 | 0.28 | 0.25 ± 0.05 | 0.09 | 0.08 ± 0.02 |
| Sample No. 42-2 | 0.21 | | 0.07 | |
| Sample No. 43-1 | 0.27 | 0.41 ± 0.2 | 0.09 | 0.14 ± 0.07 |
| Sample No. 43-2 | 0.55 | | 0.18 | |

The error was derived from the standard deviation of duplicates in each sample.

These and other modifications and variations to the present disclosure may be practiced by those of ordinary skill in the art, without departing from the spirit and scope of the present disclosure. In addition, it should be understood that aspects of the various embodiments may be interchanged, either in whole or in part. Furthermore, those of ordinary skill in the art will appreciate that the foregoing description is by way of example only, and is not intended to limit the disclosure.

What is claimed is:

1. An automotive component comprising a blow molded thermoplastic composition, the thermoplastic composition being formed by melt processing (i) a linear polyarylene sulfide containing less than about 1 mol. % of cross-linking units based on the total monomer units of the polyarylene sulfide, (ii) from 20 wt. % to 35 wt. % of an epoxy-functionalized impact modifier, and (iii) from 1.0 wt. % to 1.75 wt. % of a polyfunctional crosslinking agent that includes a dicarboxylic acid, wherein the crosslinking agent is supplied following distribution of the impact modifier with the polyarylene sulfide, and wherein the melt processing forms a crosslinked epoxy-functionalized impact modifier that is a reaction product of epoxy-functionalized monomer units and a polyfunctional crosslinking agent, wherein the composition exhibits a tensile elongation at break of about 70% or more as determined in accordance with ISO Test No. 527 at a temperature of 23° C. and at a speed of 50 mm/min.

2. The automotive component of claim 1, wherein the blow molded thermoplastic composition has a notched Charpy impact strength of greater than about 3 kJ/m² as determined according to ISO Test No. 197-1 at 23° C. and a tensile modulus of less than about 3000 MPa as determined according to ISO Test No. 527 at a temperature of 23° C. and a test speed of 5 mm/min.

3. The automotive component of claim 1, wherein the polyarylene sulfide is polyphenylene sulfide.

4. The automotive component of claim 1, wherein the thermoplastic composition further comprises a filler, UV stabilizer, heat stabilizer, lubricant, colorant, or a combination thereof.

5. The automotive component of claim 1, wherein the thermoplastic composition has a halogen content of less than about 1000 ppm.

6. The automotive component of claim 1, wherein a first section of the component comprises the thermoplastic composition, the first section being adjacent to a second section of the component that does not comprise the thermoplastic composition.

7. The automotive component of claim 1, wherein the thermoplastic composition is free of plasticizers.

8. The automotive component of claim 1, wherein the component exhibits a permeation resistance to a fuel or a fuel source of less than about 10 g-mm/m²-day as determined according to SAE Testing Method No. J2665.

9. The automotive component of claim 1, wherein the thermoplastic composition has an elongation at yield of greater than about 4.5% as determined according to ISO Test No. 527 at a temperature of 23° C.

10. The automotive component of claim 1, wherein the thermoplastic composition has a deflection temperature under load of greater than about 80° C. as measured according to ISO Test No. 75-2 at 1.8 MPa.

11. The automotive component of claim 1, wherein the thermoplastic composition has a notched Charpy impact strength of greater than about 8 kJ/m² at a temperature of −30° C.

12. The automotive component of claim 1, wherein the thermoplastic composition has a flexural modulus of less than about 2500 MPa as measured according to ISO Test No, 178 at a temperature of 23° C. and a test speed of 2 mm/min.

13. The automotive component of claim 1, wherein the thermoplastic composition meets the V-0 flammability standard at a thickness of 0.2 millimeters.

14. The automotive component of claim 1, wherein the thermoplastic composition has a tensile break stress of greater than about 30 MPa and/or a strain at break greater than about 5%, as determined according to ISO Test No. 527 at a temperature of 23° C. and a test speed of 5 mm/min.

15. The automotive component of claim 1, wherein the epoxy-functionalized impact modifier includes methacrylic monomer units.

16. The automotive component of claim 15, the epoxy-functionalized impact modifier further includes α-olefin monomer units.

17. The automotive component of claim 1, wherein the dicarboxylic acid includes terephthalic acid.

18. The automotive component of claim 17, wherein the epoxy-functionalized monomer units include epoxy-functionalized methacrylic monomer units.

19. The automotive component of claim 1, wherein polyarylene sulfides constitute from about 20% wt. % to about 78.6 wt. % by weight of the composition.

20. The automotive component of claim 1, wherein the polyarylene sulfide is functionalized.

21. The automotive component of claim 20, wherein the functionalized polyarylene sulfide is a reaction product of a polyarylene sulfide and a disulfide compound having a reactive functionality.

* * * * *